(12) United States Patent
Hays et al.

(10) Patent No.: US 8,062,713 B2
(45) Date of Patent: Nov. 22, 2011

(54) NON-INTERACTIVE ELECTROSTATIC DEPOSITION OF INDUCTION CHARGED CONDUCTIVE POWDER

(76) Inventors: Dan A. Hays, Fairport, NY (US); Peter J. Mason, Webster, NY (US); James Mason, Escondido, CA (US)

( * ) Notice: Subject to any disclaimer, the term of this patent is extended or adjusted under 35 U.S.C. 154(b) by 154 days.

(21) Appl. No.: 12/592,917

(22) Filed: Dec. 4, 2009

(65) Prior Publication Data

US 2011/0135836 A1    Jun. 9, 2011

(51) Int. Cl.
  *B05D 1/06* (2006.01)
(52) U.S. Cl. ......... 427/470; 427/475; 427/482; 427/485
(58) Field of Classification Search .................. 427/470, 427/475, 482, 485
See application file for complete search history.

(56) References Cited

U.S. PATENT DOCUMENTS

| | | | | |
|---|---|---|---|---|
| 3,437,074 A | * | 4/1969 | Hagopian et al. | 118/623 |
| 2006/0150902 A1 | * | 7/2006 | Stelter et al. | 118/621 |
| 2006/0247122 A1 | * | 11/2006 | Hampden-Smith et al. | 502/101 |

* cited by examiner

*Primary Examiner* — Frederick Parker
(74) *Attorney, Agent, or Firm* — Howard J. Greenwald

(57) ABSTRACT

A method for manufacturing electrodes using an electrostatic deposition unit. In the first step of the process a mixture of magnetic carrier beads and a conductive powder is prepared in the sump of the deposition unit; the mixture forms a magnetic brush on the sleeve of the deposition unit. In the second step of the process, the substrate is positioned away from the magnetic brush to form an air gap. In the third step of the process, a voltage is applied between the substrate and the sleeve of the deposition unit in order to produce a large asymmetry between the magnetic brush and said substrate such that the electric field at the magnetic brush is at least 3.0 times as great as the electric field at the substrate. In the fourth step of the process, conductive powder is deposited onto the substrate.

43 Claims, 16 Drawing Sheets

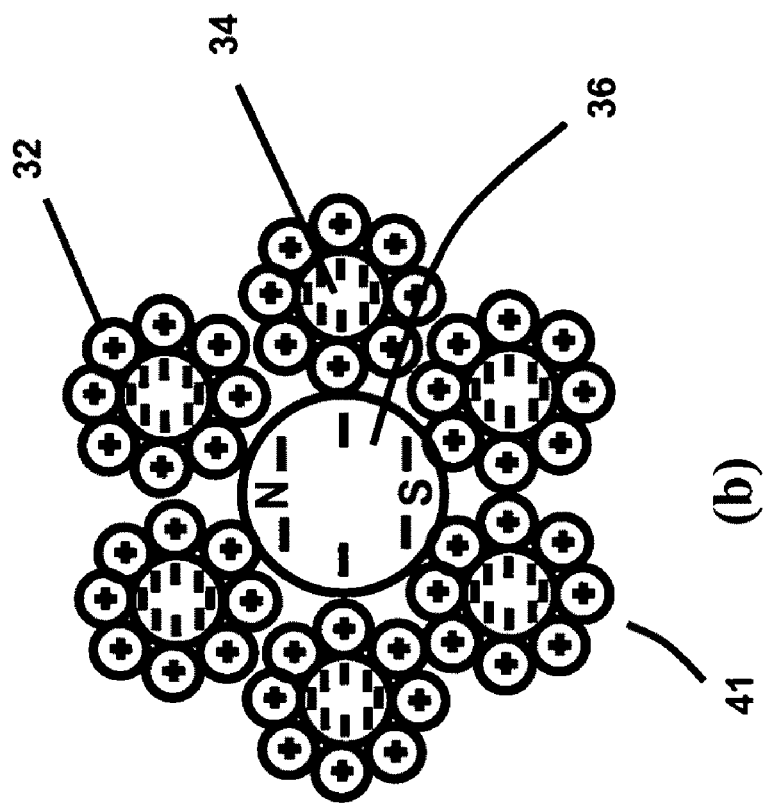
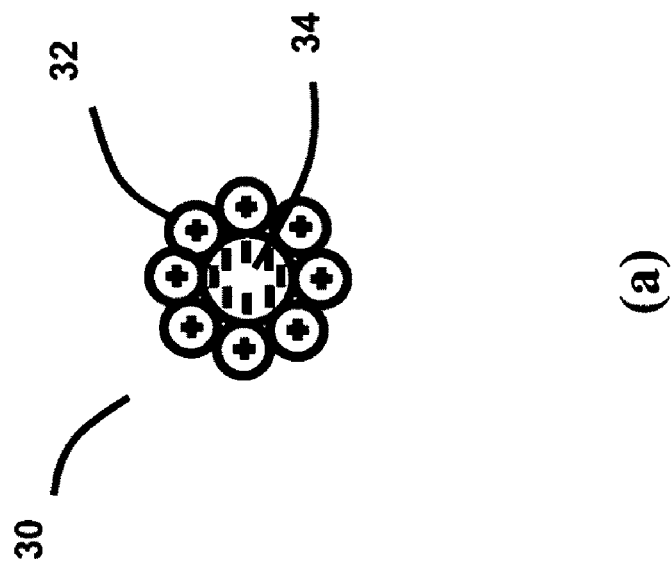
Figure 4

NON-INTERACTIVE ELECTROSTATIC DEPOSITION OF INDUCTION CHARGED CONDUCTIVE POWDER

FIELD OF THE INVENTION

A method and apparatus for non-interactive electrostatic deposition of an induction charged conductive powder or blend of conductive and insulative powders onto either a conductive or insulative substrate.

BACKGROUND OF THE INVENTION

Electrostatic powder spraying is widely used to coat (paint) many consumer products such as appliances, tools, automobiles, etc. Much of the electrophotographic industry for producing high-quality copies and prints is based on the electrostatic deposition of charged powder. Electrostatic powder deposition is also used in a number of manufacturing processes such as abrasive coatings. Most of the applications use a non-magnetic insulative powder that is charged by either triboelectricity or gaseous ions. There are many methods and apparatus for electrostatic charging and depositing non-magnetic insulative powder on either insulative or conductive substrates. The present methods and apparatus for electrostatic powder deposition of conductive powders onto either insulative or conductive substrates have limitations. For insulative substrates, magnetic or non-magnetic conductive powder is induction charged for electrostatic deposition. Magnetic powder enables transport of the powder by permanent magnets. However, the typical processes limit the deposition to about a monolayer of powder coverage, which is less than the desired coverage for many industrial applications. For the electrostatic deposition of non-magnetic conductive powder/blend onto a conductive substrate, the inventors are not aware of literature or disclosures that describe such depositions. Thus, to date there has been no method and apparatus described in the literature that enables electrostatic multi-layer deposition of non-magnetic conductive powder onto either an insulative or conductive substrate.

It is the object of this invention to provide a method and apparatus that enables electrostatic multi-layer deposition of non-magnetic conductive powder/blend onto either insulative or conductive substrates.

SUMMARY OF THE INVENTION

In accordance with this invention, there is provided a method and apparatus for manufacturing electrodes comprising the steps of: (a) depositing a conductive powder onto a substrate by using an electrostatic deposition unit in which the conductive powder is mixed with magnetic carrier beads in a sump of the unit for feeding a sleeve that enables the formation of a magnetic brush for transport and mechanical agitation of the conductive mixture via either stationary or time-dependent magnetic fields; (b) applying an electrical bias across an air gap spacing between the transported conductive mixture and substrate to create an electric field that induction charges the conductive powder and exerts an electrostatic force on the induction charged powder for electrostatic deposition onto the substrate; and (c) providing a large asymmetry in the electric field across the air gap such that the electric field at the conductive magnetic brush structure is intensified relative to the electric field near the substrate.

BRIEF DESCRIPTION OF THE DRAWINGS

The foregoing and further objects, features and advantages of the invention will become apparent from the following description of preferred embodiments with reference to the accompanying drawings, wherein like numerals are used to represent like elements and wherein:

FIG. 4 is a cross-sectional schematic drawing of a blend of conductive and insulative powder (a) mixed with magnetic carrier beads (b) for use in a powder deposition system according to the first embodiment of this invention;

DESCRIPTION OF THE PREFERRED EMBODIMENTS

Figure 1:
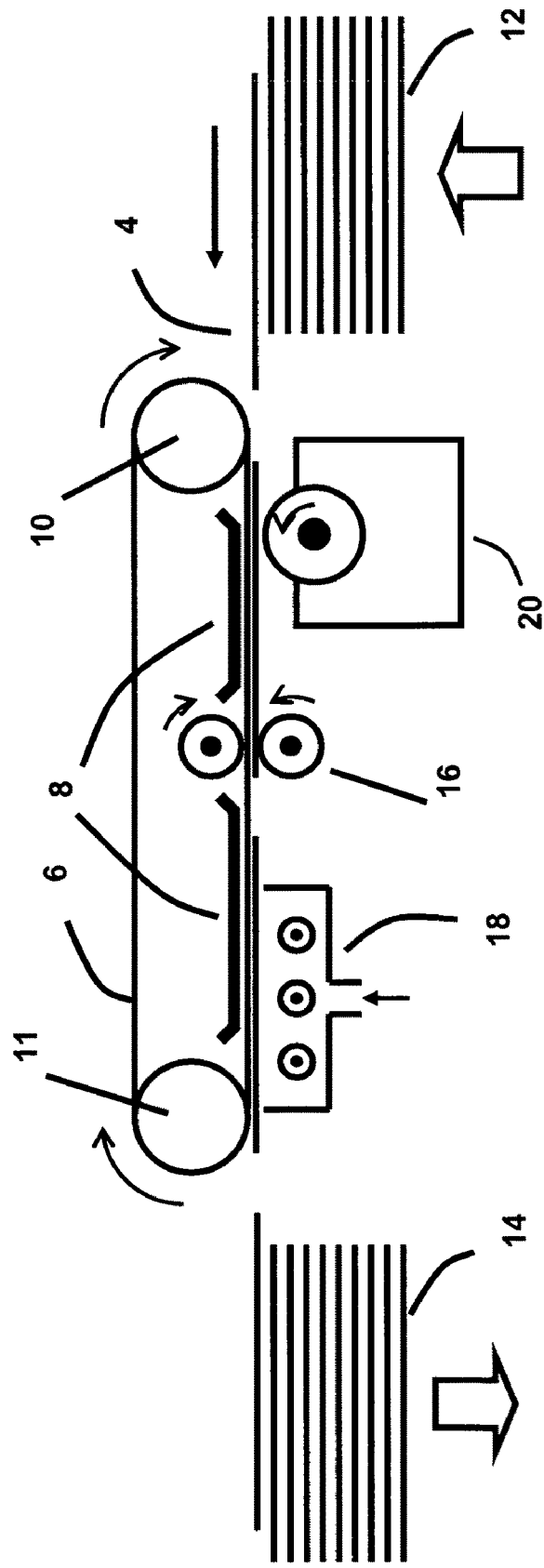
FIG. 1 is a side view schematic drawing of a manufacturing system that produces uniform powder coatings according to the first embodiment of this invention.

This invention, in one embodiment thereof, is particularly relevant to an alternative method and apparatus for manufacturing electrodes for fuel cell technologies. Fuel cells for generating electricity offer the advantages of a cleaner and more efficient technology compared to conventional fossil fuel boilers and furnaces used for steam turbine generators. For hydrogen fuel cells, the byproducts are only water and heat that can be used for other energy needs. Examples of various applications for fuel cells include locally generated power for households and businesses, power sources for automobiles and trucks, and personal mobile devices such as cell phones.

The basic building block of a fuel cell consists of an electrolyte layer with an anode and a cathode electrode on either side. Fuel such as hydrogen is continuously fed to the anode (a negative polarity electrode) and an oxidant such as oxygen in air is continuously fed to the cathode (a positive polarity electrode). Electrochemical reactions at the electrodes produce an electrical current through the electrolyte as well as a complementary current that flows through an external circuit that provides electric energy to power various devices. A stack of fuel cells in which the electrodes are interconnected provide power units with a desired output capacity.

Fuel cells are generally classified by the type of electrolyte used that includes polymer electrolyte fuel cell (PEFC), phosphoric acid fuel cell (PAFC), alkaline fuel cell (AFC), molten carbonate fuel cell (MCFC) and solid oxide fuel cell (SOFC). A critical function of any cell type is to enable electrochemical reactions at the anode and cathode electrodes by providing a three-phase interface that includes the reactant gas, catalyst that is in electrical contact with a conductive porous support layer and the electrolyte. For the PEFC and PAFC types that operate at relatively lower temperatures (40 to 200 degrees Celsius), only a few rare and expensive catalysts such as platinum (Pt) provide sufficient electrochemical activity. Consequently, it is desired to use the minimum amount of catalyst to obtain the required performance characteristics.

Due to an operating temperature of 40 to 80 degrees Celsius, the PEFC type of fuel is well suited for power source applications ranging from personal mobile devices to vehicular travel. The components of PEFC include 1) a solid ion exchange membrane made of perfluorosulfonic acid (PFSA) polymer, 2) an electrically conductive porous backing support layer (typically a carbon impregnated paper or cloth) that enables gas diffusion for both the anode and cathode electrodes, 3) a catalyst with a binder between each backing layer and the membrane, 4) gas flow plates behind each conductive porous support layer that deliver the fuel and oxidant, and 5) cell electrical interconnects among a stack of cells to form the power unit. The catalytic layers between the electrolyte and conductive porous backing support on each electrode typically consist of a blend of PFSA powder bonded to platinized carbon (Pt/C) powder. A typical amount of platinum on the anode and cathode electrodes is 0.05 milligrams per square centimeter and 0.25 milligrams per square centimeter, respectively.

The PAFC operates at a temperature around 200 degrees Celsius which makes it well suited for distributed power in homes and businesses. The cell components are similar to that of PEFC except the electrolyte is phosphoric acid in a polytetrafluoroethylene (PTFE) bonded silicon carbide matrix. The catalytic layers between the electrolyte and conductive porous backing support on each electrode typically consist of a blend of PTFE powder bonded to Pt/C powder. A typical amount of platinum on the anode and cathode electrodes is 0.25 milligrams per square centimeter and 0.75 milligrams per square centimeter, respectively.

To manufacture the catalytic layers for both the PEFC and PAFC type of fuel cells, a slurry (liquid dispersion) of PTFE with PtC is typically mixed along with an optional bulk filler that is subsequently sublimed to provide porosity. The slurry can be either rolled into a thin sheet or sprayed, roller coated or printed onto a substrate followed by oven drying. For a PEFC, the catalytic sheet can be either directly deposited or pressure/heat bonded to either the support layer or the ion exchange membrane. In the case of a PAFC, the catalytic layer is directly deposited and pressure/heat sintered to the support layer. Alternatively, the catalytic layer can be formed on an intermediate material such as PTFE for subsequent pressure/heat transfer to the desired surface. The surface of the gas diffusion layer adjacent to the catalytic layer is typically rendered hydrophobic by a coating consisting of either a liquid dispersion of PTFE or a mixture of PTFE and carbon powder. The coating is typically directly applied to the gas diffusion layer and dried. The PTFE and silicon carbide matrix that contains phosphoric acid is sandwiched between the anode and cathode catalytic electrodes. The current manufacturing method for this layer is to make a slurry of the PTFE and silicon carbide that can then be rolled into a thin sheet followed by oven drying. The dried sheet is pressure bonded to one of the catalytic electrodes.

This invention, in one embodiment thereof, also has utility in providing powder deposition methods and apparatus for manufacturing batteries such as the lithium ion battery, electrodes for organic photovoltaic solar cells and antennas such as those used for radio frequency identification devices.

In one or more embodiments of the invention, powder for electrostatic deposition is used. Such powder for electrostatic deposition can be generally classified as being either insulative or conducting and either non-magnetic or magnetic. These terms: insulative, conductive, magnetic and non-magnetic, are common terms generally used in electrophotography. The definitions are well-known to those reasonably skilled in the art and are used as such herein. For electrostatic powder coating applications, the powder is typically insulating and non-magnetic. The powder is either charged by triboelectricity or corona ions to provide an electrostatic force to cause deposition and adhesion of the powder to a conducting article to be coated. In electrophotography (see L. B. Schein, Electrophotography and Development Physics, Laplacian Press, Morgan Hill, Calif., 1996), an electrostatic image is typically formed on a photosensitive insulative layer and developed with a charged powder called toner to form a toner image that is subsequently transferred to plain paper after which the powder image is heat and pressure bonded to the paper. The development system is either single-component (toner only) or two-component in which larger carrier beads are used to charge insulative toner by the phenomenon of triboelectricity. The insulative toner in a two-component system is developed onto the photosensitive insulative layer and electrostatically transferred to paper even under high relative humidity (RH) conditions when the paper conductivity increases by many orders of magnitude. The insulative toner enables multi-layer electrostatic deposition and transfer to a paper substrate that can become conductive under high RH conditions. Although the insulative toner for two-component development systems is typically non-magnetic, the toner can also be made magnetic to either control machine dirt or enable the functionality of Magnetic Ink Character Recognition (MICR) readers.

There are many variants in the hardware and developer materials of two-component development systems with insulative toner. The initial two-component development systems used a cascade development system (disclosed in U.S. Pat. Nos. 2,618,551 and 2,618,552) in which a two-component developer mixture consisting of insulative toner and non-magnetic carrier beads is cascaded over the electrostatic image on the photoreceptor. The triboelectrically charged toner is attracted to the image areas and repelled in the non-image areas. The cascade development system was supplanted with magnetic brush two-component development systems (disclosed in U.S. Pat. Nos. 2,786,439, 2,786,440 and 2,786,441) in which the insulative toner is triboelectrically charged by insulative magnetic carrier beads. Stationary permanent magnets inside the rotating development sleeve provided transport of the two-component developer mixture to the development zone. The formation of a magnetic brush enabled the developer to be brushed against the photoreceptor for insulative toner deposition in the image areas. U.S. Pat. No. 4,076,847 discloses the use of conductive and soft magnetic carrier beads in the developer mix to provide increased developability. Typically, two-component development systems with soft magnetic carrier beads have permanent magnets inside a rotating development sleeve. U.S. Pat. Nos. 4,473,029 and 4,546,060 describe the use of hard magnetic carrier beads in the developer mixture. Typically, hard magnetic carrier beads are used with rotating permanent magnets inside a stationary or rotating sleeve. The entire disclosure of such United States patents is hereby incorporated by reference into this specification.

Magnetic carrier beads can be either soft or hard magnetized. In the case of soft magnetic materials, a magnetic field applied to the magnetic materials induces a magnetic moment that can be characterized as having a south and north magnetic pole. When the applied magnetic field is removed, the magnetic moment becomes essentially zero in which case the material is no longer magnetized. For hard magnetic materials also referred to as permanently magnetized materials, an induced magnetic moment (characterized by the south and north magnetic poles) remains when the applied magnetic field is removed.

For single-component development systems, the toner can be either conducting or insulating. For conductive toner, U.S. Pat. No. 3,909,258 describes a magnetic toner that is induction charged to provide an electrostatic force for toner deposition in the image areas on an insulative layer. The electrostatic imaging is typically obtained by either selective ion deposition on a insulative layer (Delphax process) or the electrical bias control of closely spaced ring electrodes configured under an insulative overcoating on an imaging drum (Océ process). With magnetic toner, deposition in the non-image areas is suppressed due to a magnetic force from permanent magnets rotating inside a development sleeve. When the electrostatic image areas on the dielectric layer are developed with a magnetic brush of the magnetic conductive toner, the amount of toner deposition is limited to about a monolayer of coverage. Increasing the development voltage increases the amount of induction charge on the first layer of toner adjacent to the dielectric layer, but does not provide additional toner layers. If an electrostatic force is used to transfer the induction charged conductive toner to plain paper that has a relatively high conductivity due to high relative humidity conditions, the transfer efficiency decreases since the conductive toner reverses its charge (and therefore the direction of the transfer force) by induction charging to the conductive paper. To transfer the conductive toner to conductive paper, a non-electrostatic transfer method must be used such as the application of pressure and/or heat that causes the transfer of the toner from a durable dielectric layer to the paper. The entire disclosure of such United States patent is hereby incorporated by reference into this specification.

For single-component development systems with insulative toner, the toner can be either magnetic or non-magnetic. (See Chapter 9 in L. B. Schein, Electrophotography and Development Physics, Laplacian Press, Morgan Hill, Calif., 1996.) For magnetic toner, a thin layer of toner is metered onto a rotating development sleeve with the aid of permanent magnets provided inside the sleeve to attract the toner to the sleeve. Toner rubbing with the sleeve and metering blade triboelectrically charges the magnetic insulative toner. The development of an electrostatic image by the charged toner metered on the development sleeve can be obtained by jumping across a gap with the aid of an AC voltage to induce toner cascade collisional detachment. For systems with non-magnetic toner, the toner is metered and triboelectrically charged by a rotating foam supply roller loaded against a rotating development sleeve. The development of an electrostatic image is obtained by either toner jumping across a gap with an AC voltage or asynchronous rubbing contact between the toned sleeve and photoreceptor.

Some high-speed development systems use a hybrid system in which non-magnetic insulative toner from a two-component magnetic brush system is used to continually maintain a toner layer on donor rolls which are similar to single-component development sleeves. The development of an electrostatic image is obtained by generating a toner cloud with either an AC bias applied across a gap or fringe AC electric fields produced by microelectrodes placed near toned donor rolls spaced from the electrostatic image. The latter development system as disclosed in U.S. Pat. No. 4,868,600 enables non-interactive accumulation of full-color images on the photoreceptor before transfer to paper. The entire disclosure of such United States patent is hereby incorporated by reference into this specification.

In the production of coated abrasive materials, a backing material is provided with a "maker" adhesive coating that can cause deposited grains of abrasive to adhere to it. The deposition of the abrasive grains is usually obtained by either gravity feed or electrostatic deposition. For the latter method, U.S. Pat. No. 6,511,713 describes a tray containing the abrasive in close proximity to the maker coated backing material that is electrically biased relative to a grounded electrode behind the backing material. Since the grains of abrasive are typically aluminum oxide or silicon carbide that tend to be conducting, the grains are induction charged and electrostatically attracted to the adhesive coated backing material where they adhere. The entire disclosure of such United States patent is hereby incorporated by reference into this specification.

In the fabrication of fuel cell electrodes, U.S. Pat. No. 6,627,035 teaches a method for producing a gas diffusion electrode in which a slurry of carbon black, alcohol, water and a tetrafluoroethylene emulsion is applied as a layer on a non-Teflonized substrate, which is then heated to remove the water. The dried coated carbon cloth is then rolled followed by heating to remove the wetting agents present in the tetrafluoroethylene emulsion. The coated carbon cloth is then cooled and rolled again to produce the final product. The entire disclosure of such United States patent is hereby incorporated by reference into this specification.

U.S. Patent Application Pub. No. US 2006/0045985 teaches a method comprising the steps of electrostatically charging a catalyst slurry applying such slurry onto a first surface of an ion-exchange membrane or fluid diffusion layer to form a first catalyst layer on the first surface. The entire disclosure of such United States published patent application is hereby incorporated by reference into this specification.

U.S. Pat. No. 6,787,183 teaches that an electrode base material is held by an electrostatic attraction when a voltage from a DC power source is applied to electrodes. A paste is applied to the electrode base material, and then the paste is dried to form the water-repellant layer. Subsequently, another paste is applied to the water-repellant layer, and then the paste is dried. Accordingly, the substantially flat electrode catalyst layer including an extremely small number of depressions is formed. The electrode of the fuel cell produced as described above can be used as an anode or a cathode. The entire disclosure of such United States patent is hereby incorporated by reference into this specification.

Wet catalyst layer deposition methods as described above have a number of disadvantages regarding the cell performance, manufacturing cost and manufacturing throughput rate. In using a hydrocarbon solvent such as isopropanol alcohol, ethanol, xylene, paraffins, etc., the catalyst can potentially become contaminated and the coating may contain cracks upon oven drying the coatings. Furthermore, the dispersion of the components might not be uniform which can cause non-uniformities in the catalytic layer. Moreover, the wet catalyst layer deposition method is not amenable to controlling composition across the layer thickness which might be desired for performance optimization at the electrolyte, gas and electrode interface.

In view of the disadvantages encountered with wet catalyst layer formation methods, there is a need for improved manufacturing methods and apparatus that will enable high performance, low cost and high production rates to meet anticipated future needs of the fuel cell industry. To overcome the present problems and enable significant advances in the technology, an alternative manufacturing method is desired. Towards that end, dry powder deposition methods represent a potential opportunity for overcoming the shortcomings of the wet deposition methods. The patent literature discloses a number of patents that describe methods and apparatus for manufacturing fuel cell electrodes via powder deposition.

U.S. Pat. No. 6,455,109 teaches a method of producing an electrode having a high performance in a simple and convenient manner that does not require the use of any of the medium, surfactant and pore-producing agent. In the disclosed method, a layer including a catalyst powder is formed on a surface of a polymer electrolyte film or a porous conductive electrode substrate by supplying an electrostatically-charged catalyst to the film or substrate. Alternatively, a layer including a catalyst powder is formed on a surface of a polymer electrolyte film or a porous conductive electrode substrate by spraying the catalyst powder on the surface of the polymer electrolyte film or porous conductive electrode substrate, thereby to cause the catalyst powder to adhere to the surface. The entire disclosure of such United States patent is hereby incorporated by reference into this specification.

U.S. Pat. No. 4,175,055 teaches a method for making an electrochemical cell electrode by depositing a layer of mechanically blended dry catalyzed carbon powder and dry hydrophobic polymer powder on the surface of a substrate by dispersing the mixture of powders as a cloud in a chamber over the substrate and pulling the powder onto the substrate by drawing a vacuum under the substrate. The method is particularly adapted to the high-speed manufacture of electrodes. The entire disclosure of such United States patent is hereby incorporated by reference into this specification.

U.S. Pat. No. 3,573,991 teaches a process for the preparation of thin electrodes for fuel cells having at least one barrier layer situated on its electrolyte side in contact with a catalytically active layer including the steps of depositing a finely screened powder on a support by electrostatic projection to form the barrier layer; subjecting the layer to compression and sintering treatments; and depositing the catalytically active layer by a similar process. The entire disclosure of such United States patent is hereby incorporated by reference into this specification.

U.S. Patent Application Pub. No. US 2007/0129237 A1 discloses an apparatus in which electrode powder is allowed to adhere via the electrostatic force to an electrolyte members that serves as a substrate so as to form a catalyst layer, a screen is held in a state of non-contact with the substrate, and a voltage is applied therebetween. The electrode powder is allowed to adhere to an elastic feed roller, and the feed roller is allowed to rotate in contact with the screen in pressure. The electrode powder is dispersed toward the substrate so as to stably adhere thereto via both the electrostatic force and the extruding force of the elastic body. Variations in thickness and collapse of the outline are extremely reduced on the catalyst layer to be transferred and formed on the substrate (electrolyte membrane) via the electrostatic force using a conventionally used mesh-like screen so as to obtain a membrane electrode assembly with a high product manufacturing accuracy. The entire disclosure of such published United States patent application is hereby incorporated by reference into this specification.

U.S. Pat. No. 7,022,638 B2 discloses a method and apparatus for manufacturing a fuel cell electrode, whereby the electrode material is electrostatically held on a photosensitive drum with a prescribed pattern. The electrode material of the prescribed pattern is then transferred from the photosensitive drum onto an electrolyte membrane or a membrane of a diffusion layer. The transferred electrode material of the prescribed pattern is then fixed to the membrane. The electrode material may be electrostatically applied to the membrane a plurality of times in order to vary the electrode structure in the thickness direction. The entire disclosure of such United States patent is hereby incorporated by reference into this specification.

In spite of various patents that describe the advantages of electrostatic forces for the deposition of catalytically active conductive and insulative powder blends onto substrates for fuel cell electrodes, the coating thickness is inherently limited to only a monolayer or less of coverage. However, multilayer coatings are generally required to obtain the optimum catalyst coverage on the anode and cathode electrodes. For both the PEFC and PAFC types, the catalyst such as platinum must be in good electrical contact with a highly conducting material such as carbon powder to provide electron transport in the electrode layer to an external load. The catalytically active carbon is often blended with an inert powder such as polytetrafluoroethylene that serves as a bonding agent and helps provide gas and electrolyte porosity to the electrode layer. Nevertheless, the blend of the conductive and insulative powders must also be sufficiently conductive (resistivity on the order of ohm-centimeters) for electronic conduction to the external circuit. As a consequence, an electrostatic deposition method and apparatus must be compatible with a conductive powder blend.

It is clear from the foregoing discussion of related art and an examination of the technical and patent literature that the dry powder deposition methods that have been utilized in the electrostatic powder spraying and electrophotography industries are not appropriate for obtaining either uniform or patterned electrostatic deposition of conductive powder up to multi-layers on either insulative or conductive substrates. For example, no appreciable amount of conductive powder in contact with a conductive substrate can be electrostatically deposited with the present dry powder deposition method. For an insulative substrate, the deposition is limited to approximately a monolayer of coverage when the electrically biased conductive powder is brought into contact with the substrate.

The present invention, in one embodiment thereof, overcomes limitations on coating thickness and deposition rate when electrostatic forces are used for the deposition of either conductive powder or a blend of conductive and insulative powders onto either conductive or insulative substrates. It is the object of such embodiment of the present invention to provide a method and apparatus for uniform or patterned deposition of conductive powder or a blend of conductive and insulative powders onto either conductive or insulative substrates.

In one embodiment, consequently, there is provided a means for electrostatic deposition of conductive powder up to multi-layers onto conductive or insulative substrates for fabrication of electrodes for various applications including, for example, fuel cell and battery electrodes. The conductive powder or a blend of conductive powder with insulative powder is mixed with larger magnetic carrier beads to enable magnetic brush formation and mixture transport by either stationary magnets and rotating sleeve or rotating magnets and a stationary or rotating transport sleeve. By applying a voltage across an air gap between the magnetic brush and substrate, the electric field at the magnetic brush is intensified to cause induction charging and detachment of the conductive powder or blend of powder for the electrostatic deposition onto the substrate where the electric field is relatively weak. The powder deposited on the substrate can subsequently be compacted and sintered by heating if required.

Detailed Description of One Preferred Embodiment

Hereinafter, a method and apparatus for electrostatic coating insulative or conductive substrates with conductive powder or blends according to the first embodiment of this invention will be described with reference to FIGS. 1 through 7. With reference to FIG. 1, an exemplary apparatus and process steps will first be described for coating conductive powder or blends onto supporting substrates. A stack of substrates 12 to be coated of desired size is advanced upward as a single substrate sheet 4 is periodically urged to a substrate-transporting belt 6 for the conveyance of the substrate through different processs stations. The technologies for feeding sheets of materials to be processed by a system are a well-known art in the printing industry. A variety of different mechanisms used in the industry for providing the sheet feeding functionality are applicable to the present invention. The gripping of the substrate to the transporting belt can be obtained by any combination of mechanical, vacuum and electrostatic forces. For electrostatic gripping, the surface of the transporting belt consists of dielectric overcoated interdigitated electrodes connected to a DC or AC voltage supply. The fringe electric fields from the electrically biased interdigitated electrodes provide an electrostatic gripping force acting on an insulative or conductive substrate that is in close proximity. In the case of a conductive substrate, an alternative electrostatic gripping method can be obtained by replacing the interdigitated electrodes with a planar electrode that is preferably AC biased relative to the substrate. Backing plates 8 are provided to stabilize the vertical motion of the transporting belt between the drive 10 and idler 11 rolls.

In one preferred embodiment, the substrate used in the process of this invention is substantially planar.

In one embodiment, the substrate used in the process of this invention is a conductive substrate. As used herein, the term conductive substrate refers to a substrate that has a conductivity of at least about $10^{-11}$ Siemens per meter. In one aspect of this embodiment, the conductivity of the substrate is at least about $10^{-8}$ Siemens per meter.

In another embodiment, the substrate used in the process of this invention is an insulative substrate that has a charge relaxation time of greater than 10 seconds. Means for determining the charge relaxation time of a substrate are well known and are described, e.g., elsewhere in this specification.

In one embodiment, the charge relaxation time of the insulative substrate is greater than 100 seconds.

The single substrate sheet 4 passes by various stations due to the movement of the transporting belt. The first station 20 applies a powder coating to the substrate sheet 4 by an electrostatic deposition process to be described in detail later. Although the deposited layer has sufficient adhesion and cohesion due to a combination of van der Waals and microscopic electrostatic forces (to be described in detail later) for the adherence of the layer to the substrate sheet, the powder layer can be easily disturbed and consequently requires enhanced bonding of the powder layer to the substrate. Towards that requirement, a second station 16 is provided that utilizes mechanical pressure to bring the components of the powder layer into intimate contact via compaction. The station 16 illustrates a compliant bonding roll in contact with a powder layer formed on the substrate sheet. A pressure roller is positioned behind the transporting belt in the region opposing the bonding roll. Various roll materials including release agents can be employed to provide low powder offset to the compliant roll.

To provide additional bonding strength of the powder layer to the substrate sheet, the materials can be heated by station 18 to a temperature that is sufficient for sintering the thermoplastic component. Various heat energy sources can be utilized including ovens, radiant heaters, flash lamps, etc. When high surface temperatures are required, an inert gas such as nitrogen can be used to purge the cavity of any air to prevent oxidation and flammability.

The coated, compacted and sintered substrate sheets are released from the transport belt, and such release is aided by the beam strength of the sheet near the point where the transport belt wraps around the idler roll 11. The finished sheets are stacked 14 by methods similar to those utilized in the printing industry. Although the stations for powder coating 20, compaction 16 and sintering station 18 are configured along a substrate transporting belt to enable a continuous process, it is understood that the process steps can be arranged in any combination of inline processes or separate stations for a stepwise process. For example, a substrate transport belt can be used for the powder coating 20 and compaction 16 process steps, whereas an offline process can be used for the sintering operation 18.

Figure 2:
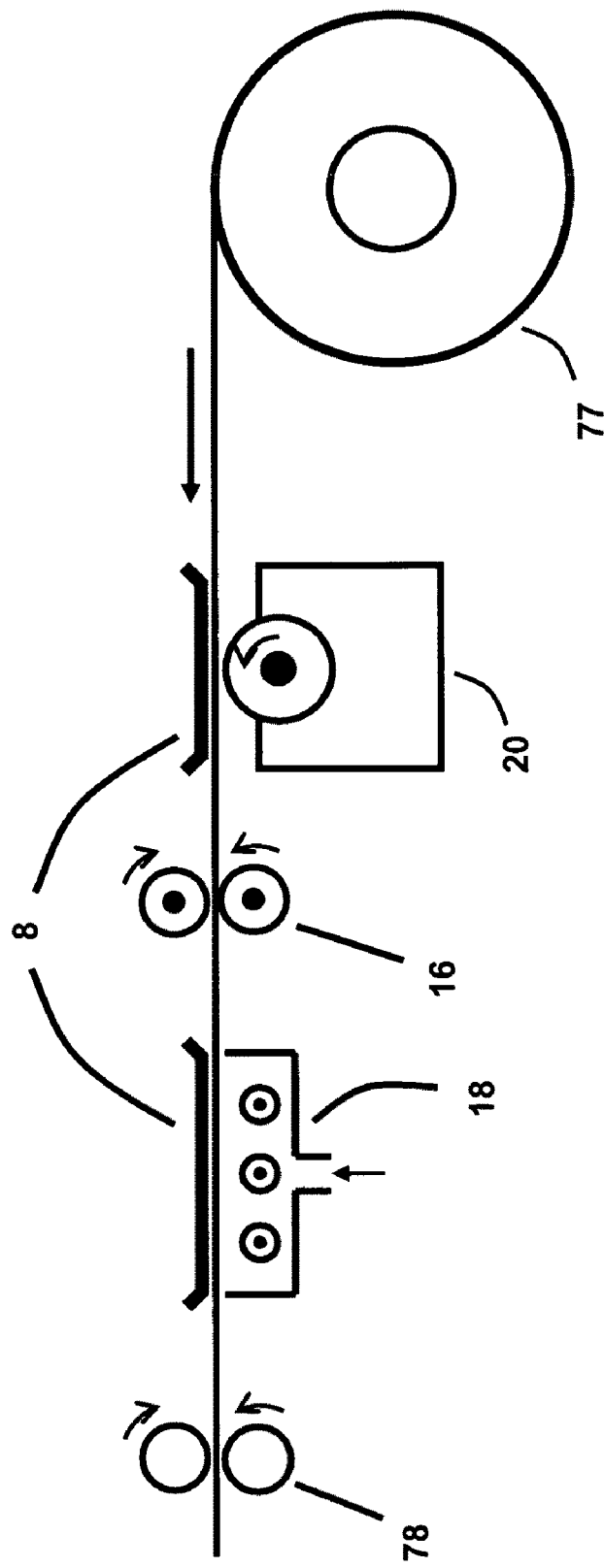
FIG. 2 is a side view schematic drawing of an alternative manufacturing system that produces uniform powder coatings according to the first embodiment of this invention.

FIG. 1 illustrates apparatus for powder coating substrates that are precut to size for stacking and feeding. For other coating applications, it may alternatively be preferable to supply the substrate in roll form as illustrated in FIG. 2. The continuous substrate web 77 can be fed past the various stations for producing the desired coating. A finished article can be cut from the web material after the exit rolls 78 to obtain a desired size and shape.

Figure 3:
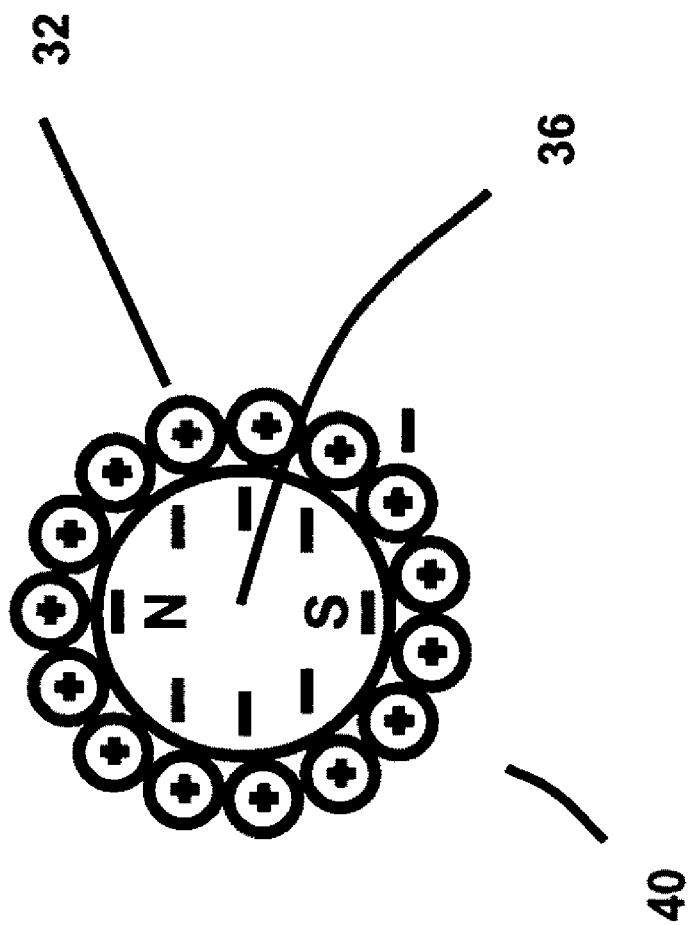
FIG. 3 is a cross-sectional schematic drawing of conductive powder mixed with magnetic carrier beads for utilization of a powder deposition system according to the first embodiment of this invention.

Before describing the process and hardware 20 for electrostatic powder deposition as depicted in FIGS. 1 and 2, it is informative to first provide a more detailed description of the conductive powder mixed with larger carrier beads that preferably are permanently magnetized as illustrated by the N and S designations in FIG. 3. The conductive powder 32 can consist of a homogeneous material such as carbon powder, carbon nanotubes, carbon fibers, metals, ceramics, semi-conductors, metal oxides, etc. or a mixture thereof of different materials. Furthermore, the conductive powder can be produced from an inhomogeneous mixture of materials such as carbon powder, carbon nanotubes, carbon fibers, metals, ceramics, semi-conductors, metal oxides, etc. dispersed in a polymeric matrix that enables the sintering of the particles by heat and/or pressure. The electrical conductivity of the conductive powder must be sufficient to enable induction charging for time less than about a second, corresponding to a conductivity of about $10^{-11}$ Siemens per meter.

When reference in this disclosure is made to conductive powder, it is to be understood it refers to any powder that has a specified charge relaxation time, regardless of whether such powder is a homogeneous material, an inhomogeneous material, or a blend of such materials with insulative powder.

The homogeneous or inhomogeneous material or blend of materials is conductive if it has a charge relaxation time of less than about 1 second. The charge relaxation time is determined by subjecting the powder to a gaseous ion source and measuring the decay in the electrostatic surface potential. The time that it takes for the potential to decay to 1/e (0.368) of the initial potential is a measure of the charge relaxation time.

In one preferred embodiment, the charge relaxation time of the conductive powder is less than about 10 milliseconds.

The permanently magnetized carrier beads 36 illustrated in FIGS. 3 and 4b are similar to those utilized in some development systems for electrophotography. Although a variety of carrier bead materials with a wide range in electrical conductivity can be used for the purposes of this invention, preferable bead materials include permanently magnetized ferrites such as manganese ferrite, strontium ferrite, etc. To control the triboelectric charging properties, the carrier beads are usually coated with a polymer such as acrylic, silicone, fluoro-silicone, fluoro-acrylic, polyvinylidene fluoride, etc. When the conductive powder 32 or a blend 30 of conductive powder with another powder are mixed with carrier beads 36 to form the mixtures 40 or 41 (See FIGS. 3 and 4), one expects triboelectric charging between the powder and beads. This is illustrated by the negative charge (negative signs) on 36. The counter charge is on the powder 32 or 30 such that the net charge on the mixture of the powder and carrier beads is nominally neutral. The triboelectric charging provides an electrostatic force that serves to bind the powder or blend to the permanently magnetized carrier beads. The strength of the electrostatic bonding can be controlled by the triboelectric charging properties of the carrier bead coating. Although FIGS. 3 and 4b illustrate one example of relative charge polarities between the conductive powder 32 or blend 30 and carrier beads 36, it is understood that any combination of polarities and magnitude of triboelectric charging can be utilized through the judicious selection of materials.

In one embodiment, the mixture of carrier beads and conductive powder preferably has a charge relaxation time of less than about 1 second and, more preferably, less than about 10 milliseconds. The procedure of determining charge relaxation time is set forth in another portion of this specification.

It is preferred, in one embodiment, that the mixture of conductive with carrier beads contain from at least 60 weight percent of carrier beads and, more preferably, at least 75 weight percent of carrier beads.

The electrical conductivity of the carrier beads can have a wide range spanning insulating to conducting. For carrier beads that have an electrical conductivity in the range of insulating to semi-conducting, it is important that the mixture of the beads with the conductive powder or blend be sufficiently conducting to enable induction charging of the powder. The size of the carrier beads applicable for the applications described in this disclosure typically range from about 20 to about 1000 micrometer in average diameter.

FIG. 4a illustrates a conductive powder blend 30 consisting of conductive 32 and insulative 34 particles. The conductive powder 32 can consist of a homogeneous or non-homogeneous mixture of materials as discussed in reference to FIG. 3. For the insulative powder 34 component of the powder blend 30, the material can be typically any polymeric material that provides desired properties for the processing and functionality of the powder coating. Examples of such insulative polymeric materials include polytetrafluoroethylene (PTFE), fluoropolymers, polyamide, polystyrene, polyethylene, polypropylene, etc. or co-polymers or a mixture thereof of different materials. Such materials can be chosen for enabling the bonding of the homogeneous or non-homogeneous conductive powder 32 to the insulative polymeric powder 34 during the compaction 16 and heating 18 process steps as illustrated in FIG. 1. When conductive powder 32 is blended with insulative powder 34, it is important that the blend 30 have sufficient electrical conductivity to enable induction charging of the powder when mixed with the carrier beads 36.

The average aggregated particle size for the insulative powder can range from about 3 to about 400 micrometers. Although the percentage by weight of the conductive powder and insulative powder depends on the relative average particle sizes and their size distributions, typical percentages are from about 60% by weight of conductive powder to about 40% by weight of insulative powder.

The powder blend 30 consisting of conductive 32 and insulative 34 powder components is obtained by combining the components in a mixing vessel for which high shear forces can be used to enable a uniform dispersion of the two powders. During the blending operation, it is anticipated that triboelectric charging will occur between the conductive and insulative powders as illustrated in FIG. 4a. The triboelectric charging between the two types of powder provides an electrostatic force of adhesion that binds the powders together.

Figure 5:
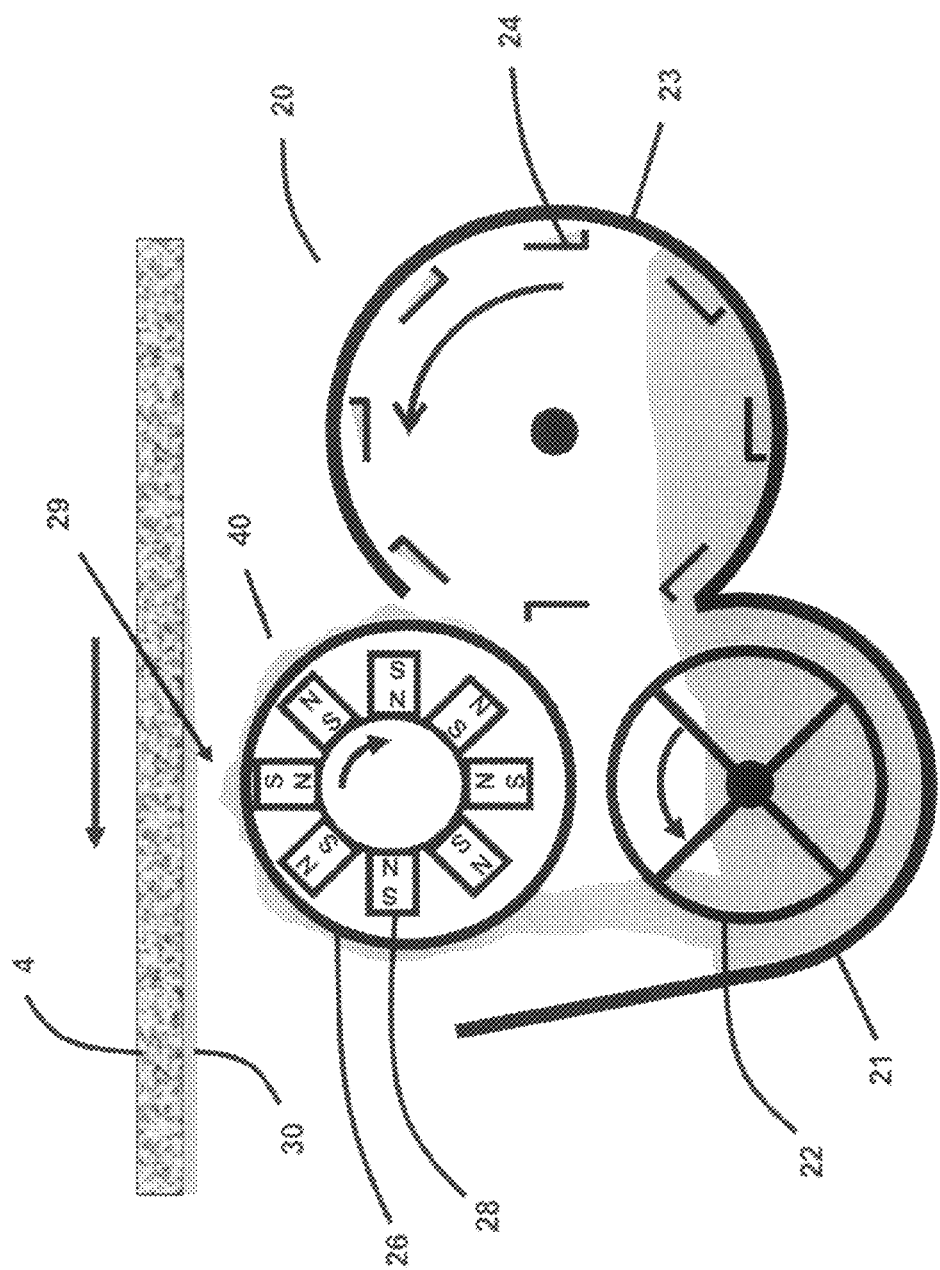
FIG. 5 is a side view schematic drawing of the elements for a powder deposition system according to the first embodiment of this invention.

FIG. 5 illustrates a first embodiment of an electrostatic powder deposition apparatus 20 that contains the mixture 40 or 41. The mixture of the conductive powder 32 or powder blend 30 and the permanently magnetized carrier beads 36 is loaded into a sump 21 that contains a cross mixer 22 for the purpose mixing the powder with the carrier beads and ensuring that the concentration of the powder in the mixture is uniform across the process direction. As the powder/blend material is depleted due to deposition onto substrate 4, powder/blend material is added to the sump with a dispenser (not shown in FIG. 5) that continuously or periodically replenishes the powder. The sump can be fitted with a sensor such as an optical or permeability sensor for monitoring and controlling the powder/blend concentration within a desired range. The level of the mixture 40 or 41 in the sump is sufficient to cause the mixture to partially fill an adjacent mixture transport/metering section 23 that has a rotating paddle wheel 24 in close proximity to the inner wall of the cavity. Buckets on the paddle wheel remove the mixture from the partially filled cavity so that it can be lifted and transported to the sleeve 26. The rate of mixture delivery to 26 can be controlled by the rotation speed of the paddle wheel and the capacity and number buckets on the wheel.

Inside the sleeve 26, a rotating assembly of permanent magnets 28 is provided for the purpose of magnetically attracting the magnetic mixture 40 or 41 to the sleeve. An even number of permanent magnets are uniformly spaced on a rotating shaft and arranged to have an alternating magnetic pole polarity. This configuration provides a magnetic field profile outside the sleeve in which the magnetic field is in the radial direction at a region near the magnets and a tangential magnetic field in the angular region between the magnets. When the mixture 40 or 41 is on the sleeve 26 with magnet assembly 28, the mixture 40 or 41 forms magnetic brush bristles in the region of the magnetic poles and a compressed layer in the angular regions between the poles. With a stationary sleeve 26, the mixture 40 or 41 is transported in a counter clockwise direction towards the deposition zone 29 when the magnet assembly is rotated in the clockwise direction. The transport is due to a tumbling action of the mixture caused by the rotating magnets. The rate of mixture transport depends on the rotation speed of the magnet assembly and the mixture loading on the sleeve. To facilitate the release of the mixture 40 or 41 into the mixing sump 21, the shaft of the rotating magnet assembly is offset from the center of the sleeve as illustrated in FIG. 5. The larger gap in the spacing of the magnets from the sleeve in the lower section reduces the magnitude of the magnetic field outside the sleeve. The lower magnetic field in this region aids the release of the mixture from the sleeve.

Figure 6:
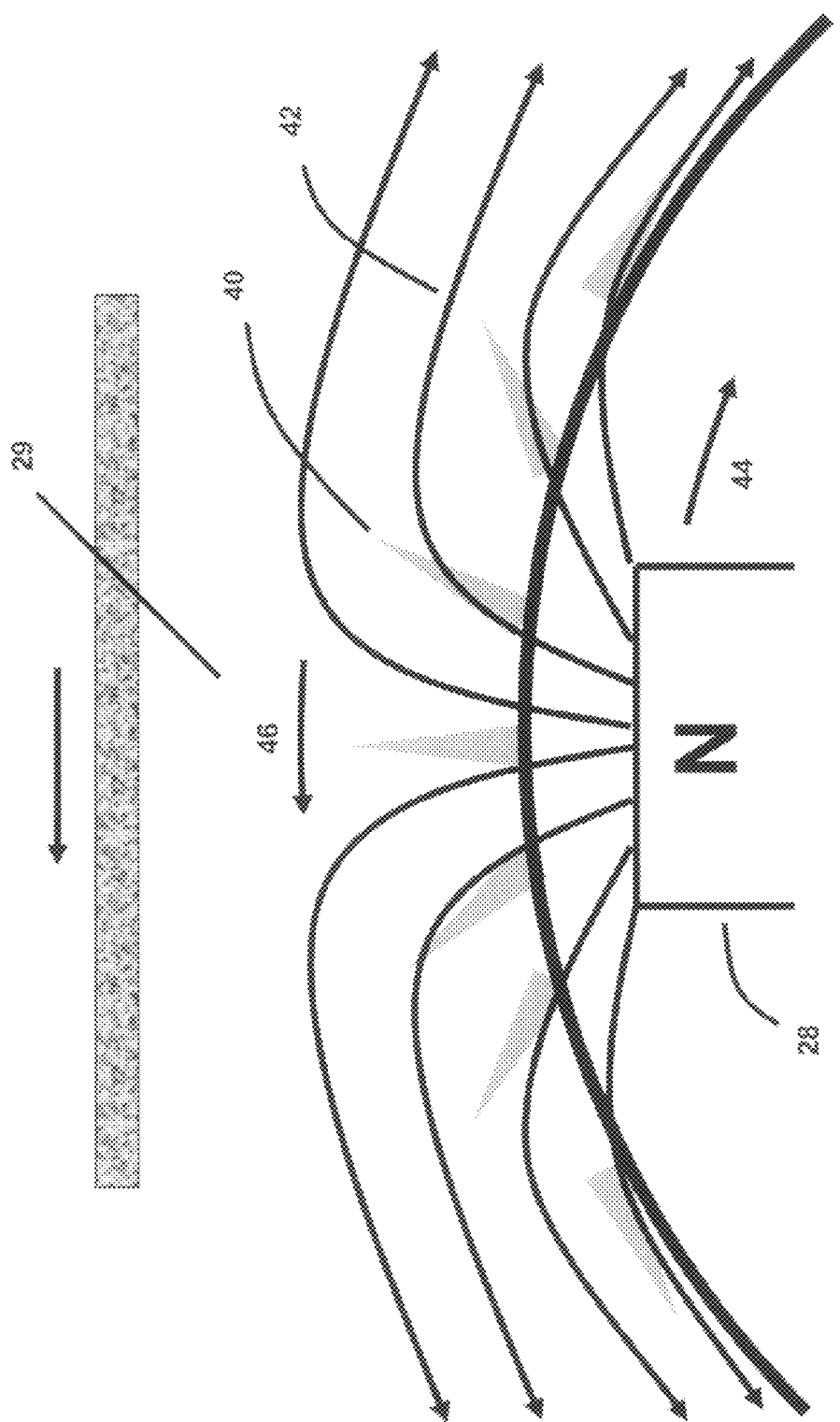
FIG. 6 is a cross-sectional illustration of the brush structure on the deposition roll formed by magnetic forces acting on a magnetic component of the powder materials mixture according to the first embodiment of this invention.

FIG. 6 provides a more detailed description of the deposition zone 29 when a magnetic pole 28 rotates 44 through the deposition zone. Magnetic field lines 42 are in the radial direction near the magnetic pole and become tangential in the angular regions to either side of the pole. In the radial magnetic field region, the magnetic mixture forms a bristle magnetic brush illustrated in the figure by the conical shapes of mixture 40 or 41. As the magnets rotate in the direction 44, the mixture 40 or 41 tumbles and is transported in the opposite direction 46.

Figure 7:
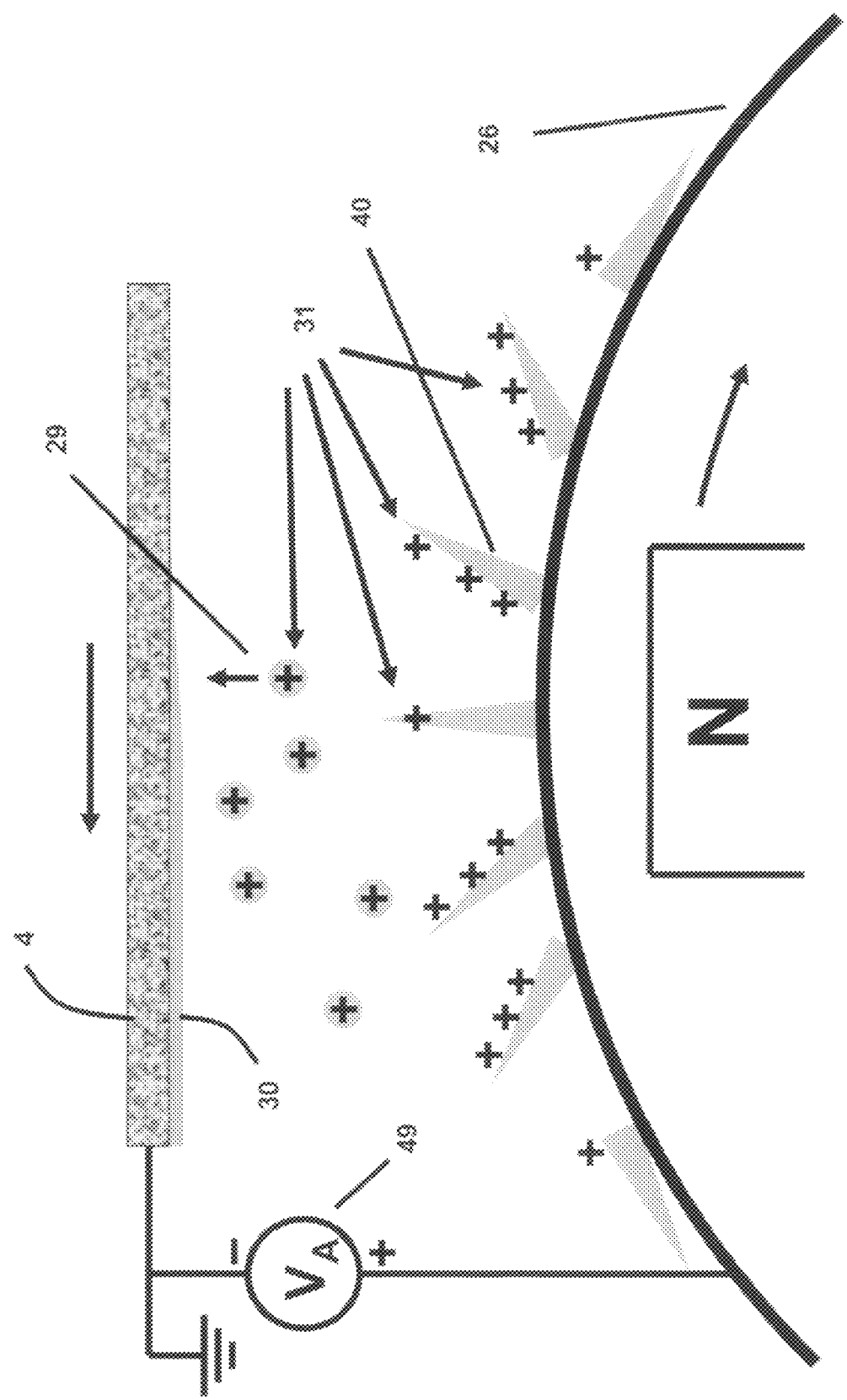
FIG. 7 is a cross-sectional illustration of electric field intensification at the magnetic brush structure that induction charges the conductive powder or blend for electrostatic deposition onto a substrate according to a first embodiment of this invention.

FIG. 7 is similar to FIG. 6 except a detailed illustration of the electrical bias voltage and induction charging within the deposition zone 29 is shown. Whereas the magnetic brush for most development systems used in electrophotography is interactive in that it makes rubbing contact with the substrate 4, the deposition of a conductive powder or blend with insulative powder onto either a conductive or insulative substrate requires non-interactive deposition enabled by an air gap spacing between the magnetic brush and the substrate. The air gap spacing ensures that the brush does not make physical contact with the substrate as illustrated in FIGS. 6 and 7. A bias voltage 48 is applied between the sleeve 26 and the substrate 4 that can be either a conductive material or an insulative material with a conductive electrode on the back. The bias voltage provides an electric field in the space 29 between the sleeve 26 and substrate 4. Since the magnetic brush 40/41 is conducting due to the conductive powder or blend with insulative powder, the electric field is highly intensified along the sides and ends of the highly structured brush segments. This high electric field intensification induces charge 31 into the conductive powder 32 or blend 30. The combination of the high electric field due to the brush structure and the charge induced in the powder/blend provides a high electrostatic force for the detachment of the powder 32 or 30 from the carrier beads 36. Upon detachment of the charged powder/blend from the carrier beads, an electrostatic force continues to act on the powder to cause transport across the air gap for deposition onto the substrate. The electric field within the space and near the substrate is much weaker than the intensified electric field at the brush. This high degree of asymmetry between the electric field at the powder charging and detachment (magnetic brush) side and the receiver (substrate) side enables the deposition of multiple powder layers on either conductive or insulative substrates. The weak electric field near the substrate suppresses reversal induction charging of the powder when it is either deposited on a conductive substrate or a previously deposited (more than monolayer) conductive powder. The adhesion and cohesion of the deposited conductive powder is aided by van der Waals forces and in the case of a powder blend a combination of van der Waals and electrostatic forces due to microscopic electric fields from triboelectric charging between the conductive and insulative powders.

Referring again to FIG. 7, it will be seen that there is an air gap in the deposition zone 29 that is disposed between the sleeve 26 and the substrate 4. A voltage 48 is applied between the substrate 4 and the sleeve 26, creating an electric field. The electric field is the negative gradient in electric potential.

The electrostatic powder deposition apparatus 20 illustrated in FIGS. 5 to 7 along with the associated description represent a first embodiment in which the mixture 40 or 41 of the powder 32 or blend 30 and permanently magnetized carrier beads 36 is loaded into a sump 21 that contains a cross mixer 22. An adjacent transport/metering section 23 has a rotating paddle wheel 24 for lifting and transporting the mixture to the sleeve 26. Inside the stationary sleeve 26, a rotating magnet assembly 28 causes the formation of a magnetic brush structure for transport of the mixture.

According to a second embodiment, a variety of methods and apparatus can be used for mixing and transporting the mixture 40 or 41 to the sleeve 26. Such methods are well known from designs for electrophotographic development systems that employ components such as augers, magnetic rollers, buckets, etc. Such methods and apparatus can be incorporated in the apparatus 20 for electrostatic deposition of conductive powder/blend onto a substrate.

According to a third embodiment, the sleeve 26 can be rotated in either direction to either augment or decrease the mixture 40 or 41 flow rate due to the rotating magnet assembly 28.

According to a fourth embodiment, the sleeve 26 can be rotated in a direction that transports the mixture 40 or 41 from the supply side. Inside the sleeve, stationary magnets are provided in the mixture transport zones to provide minimum agitation of the mixture whereas a small rotating magnet assembly is configured in the deposition zone between the transport zones to provide a high mixture agitation for increasing the deposition rate.

According to a fifth embodiment, the development sleeve 26 can be rotated in a direction that transports the mixture 40 or 41 from the supply side and stationary magnets are provided inside the sleeve for mixture transport and deposition.

Figure 8:
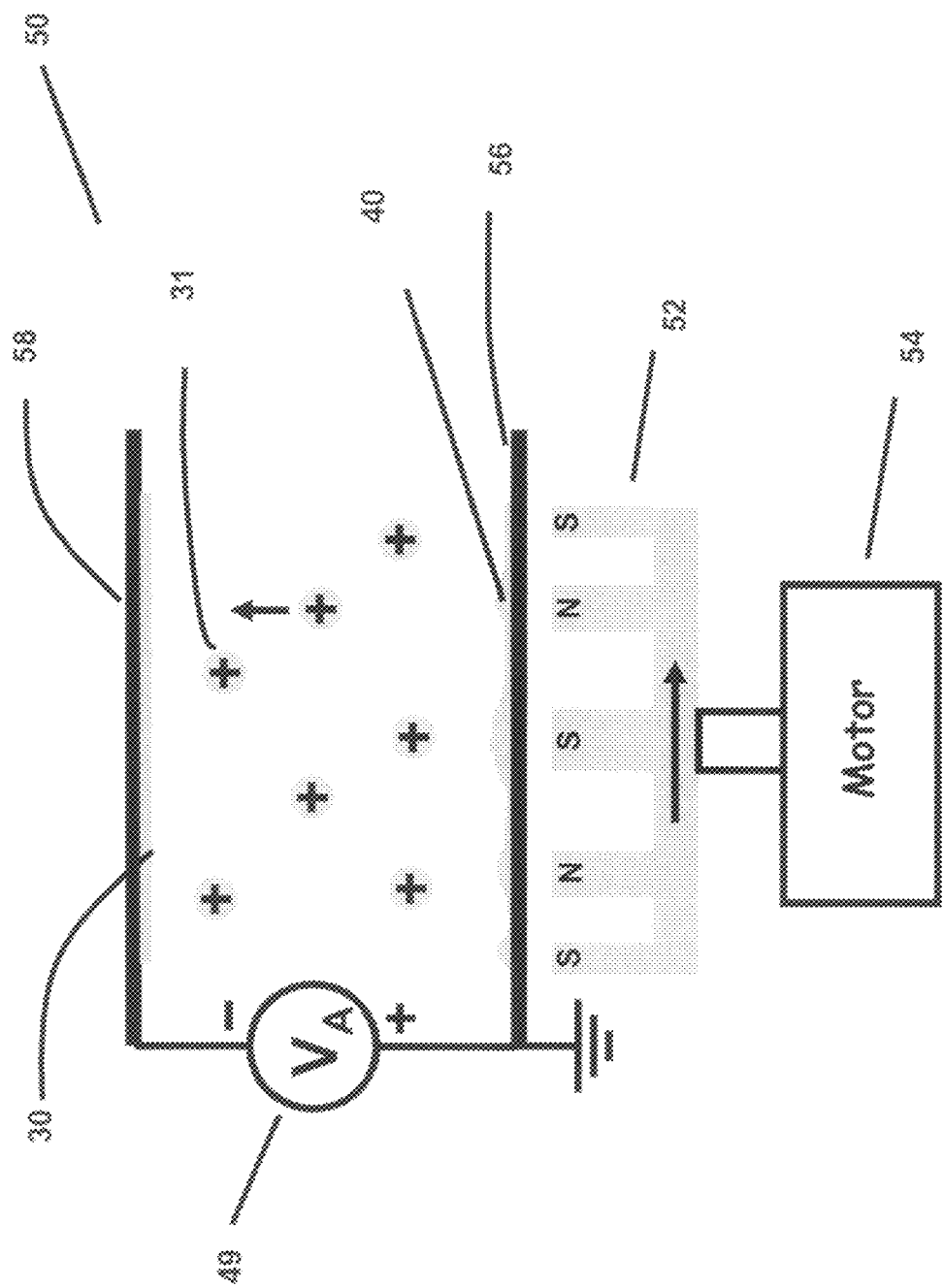
FIG. 8 is schematic drawing of a surrogate apparatus for measuring electrostatic powder charging and electrostatic transfer across a gap.

The apparatus 50 illustrated in FIG. 8 represents a useful surrogate of the powder deposition zone 29 shown in FIG. 5. The apparatus enables rapid characterization of small quantities of various combinations of mixture materials. Permanent magnets are periodically spaced near the perimeter of a disk 52 that is rotated by a variable speed motor 54. A small quantity (about 0.3 grams) of the mixture 40 or 41 is placed on the grounded substrate 56. A variable voltage source 49 is applied between a lower grounded electrode 56 and an upper electrode 58. The spacing between the electrodes is typically 1 cm, although smaller spacings can be used provided there is an air gap between the magnetic brush and upper electrode. Although not illustrated, a high capacitance electrometer can be connected to either electrode to provide measurements of charge induced on either electrode due to the removal or deposition of charged powder on the lower electrode 56 and upper electrode 58, respectively.

To obtain measurements for the transfer of powder 32 or powder blend 30 to the upper electrode 58, a mixture of the powder/blend and magnetic carrier beads is placed on the lower electrode. The loaded electrode is weighed to determine the mixture amount. When the voltage source 49 and motor 54 are switched on, the transfer of charged powder/blend across the spacing causes a change in the charge induced on the electrodes. The motor and voltage source are typically switched off when there is an insignificant increase in the charge level. Since the permanent magnets on 52 are near the perimeter of a disk, the mixture on the lower electrode forms a ring that is subjected to alternating magnetic poles that produce a magnetic brush wave and hence mixture transport in the direction opposite to the rotation direction 52. The deposition of the powder 32 or powder blend 30 on the upper electrode 58 is also in the shape of a ring. By measuring both the charge and mass (weight) of the deposited powder, one can obtain measures of the powder charge-to-mass ratio, Q/M, the deposited mass per unit area, M/A, and the percent of powder detached from the mixture.

Figure 9:
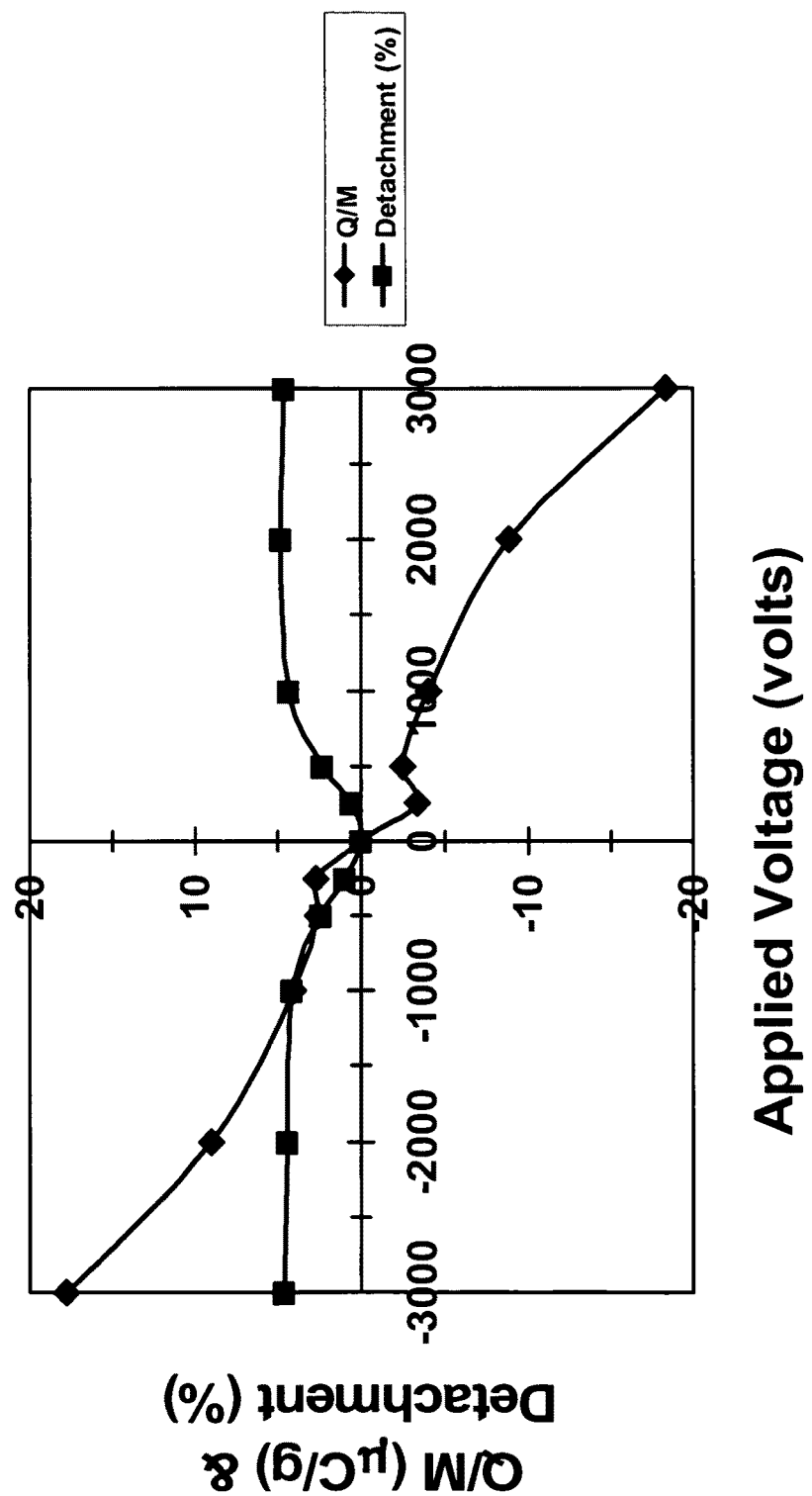
FIG. 9 illustrates the amount of powder transfer and charge-to-mass ratio versus the magnitude and polarity of an applied potential across a gap for the deposition of a conductive powder onto a substrate with an insulative coating.

FIG. 9 shows a graph of Q/M and detachment percentage as a function of the applied voltage 49 for a conductive Cabot XC-72R carbon powder with a primary particle size of 0.03 micrometer but an aggregated average size around 10 micrometer. A 5% concentration by weight of the powder was mixed with carrier beads in a rotating glass jar for about 30 minutes. The carrier beads of 80 micrometer average size consisted of permanently magnetized strontium ferrite partially overcoated with polyvinylidene fluoride. About 0.22 grams of the mixture was loaded onto the lower electrode 56 of FIG. 8. With an eight-pole magnet operating at 1500 revolutions per minute for 30 seconds, the powder was induction charged and transported by an electrostatic force due to the applied voltage across the spacing of 1 centimeter. For an applied voltage magnitude of 2000 volts or greater, one can see that the curve for Detachment % in FIG. 9 was near 5% which was the percentage of powder in the initial mixture. For this range of applied voltages, most of the powder in the mixture was electrostatically detached and transferred to the upper electrode. For a lower magnitude of the applied voltage, the percentage of powder that can be removed decreased to the point where essentially no powder is deposited at zero volts.

The symmetrical dependence of the Detachment % on the applied voltage is a well-known signature for induction charging of conductive powder. If the powder happened to be insulative and triboelectric charged by the carrier beads, the Detachment % curve would be highly asymmetrical in that powder would be transferred for one polarity whereas little or no powder would be transferred for the reverse polarity.

To obtain reliable measurements of the charge transfer to the upper electrode, it was necessary to cover the upper conductive electrode with a highly insulative layer such as poly(4,4'-oxydiphenylene-pyromellitimide)tape (50 micrometers thick) for the purpose of suppressing charge exchange between the conductive powder and conductive electrode. The Q/M curve in FIG. 9 for the charge-to-mass ratio of the conducting powder deposited on the upper electrode shows that the dependence of the Q/M magnitude on the applied voltage is independent of voltage polarity. The dependence of the Q/M polarity on applied voltage polarity is also consistent with the induction charging mechanism for charging the conductive powder. The Q/M curve in FIG. 9 for conductive powder transferred with an applied voltage magnitude of 3000 volts is about 50% greater than the magnitude of Q/M for 2000 volts. Over this voltage range, the Detachment % was essentially constant at the 5% level. Consequently, the charge on the deposited powder for this voltage range was proportional to the magnitude of the applied voltage.

A measurement of the charge-to-mass ratio, Q/M, of the conductive particles deposited on the substrate provides a measurement for the magnitude of the intensified electric field at the magnetic brush. If a conductive spherical particle of radius, r, is in contact with a conductive surface and subjected to an applied electric field, $E_a$, a charge will be induced on the particle with a magnitude given by the equation $$Q = 6.56\pi \epsilon_o E_a r^2 \quad (1)$$

where the permittivity of vacuum is $\epsilon_o = 8.854 \times 10^{-12}$ F/m. (See http://www.electrostaticanswers.com/2009ESJC/2009ESJC.htm for a paper on "Dynamics of Induction Charging for Multiple Particle Agglomerations with a Thin Conducting Surface Layer" by B. F. Nader, G. S. P. Castle and K. Adamiak) If the particle has a density of $\rho$, the charge-to-mass ratio of the particle is given by the equation $$Q/M = \frac{4.92 \epsilon_o E_a}{\rho r}. \quad (2)$$

A measurement of the average Q/M of conducting particles deposited on a substrate provides a measurement of the average intensified electric field that induction charges the conductive particles at the magnetic brush. The intensified electric field that produces a charge-to-mass ratio of Q/M for a particle of radius r can be obtained from Eqn. 2. The intensified electric field $E_I$ is $$E_I = \frac{1}{4.92} \left(\frac{Q}{M}\right) \frac{\rho r}{\epsilon_o}. \quad (3)$$

It should be noted that Eqns. 1-3 are applicable to a single conductive particle on a conductive substrate. In practical applications, the conductive particles are arranged in a layer. The electric field acting on any one particle is reduced by the proximity of neighboring particles. Under these conditions, the intensified electric field that produces the induction charged particles is actually greater. With reference to the paper by Nader, et al, the intensified field is estimated to be about a factor of 2 greater for a particular particle charge. For a layer of conductive particles, the intensified electric field that induces a particular charge-to-mass ratio is about twice the magnitude given by Eqn. 3. Thus, the intensified electric field for a layer of particles is approximately $$E_I = 0.4 \left(\frac{Q}{M}\right) \frac{\rho r}{\epsilon_o}. \quad (4)$$

From the data shown in FIG. 9, one can calculate the magnitude of the electric field asymmetry between the magnetic brush and substrate. For an applied voltage of 2000 volts across an air gap of 1 cm, the electric field in the air gap near the substrate where the charged particles are deposited is 0.2 volts per micrometer. This magnitude of electric field at the substrate is sufficiently weak such that the electrostatic force acting on the deposited particles is insufficient to overcome the short range adhesion forces acting on the particles. For a 2000 volt applied voltage, the Q/M magnitude of the deposited particles is about 10 microcoulombs per gram. For particles with an average radius of 5 micrometers and density of 1 gram per centimeter cubed, the average intensified electric field from Eqn. 4 is 2.3 volts per micrometer. The intensified electric field at the magnetic brush where the induction charging occurs is an order of magnitude larger than the 0.2 volts per micrometer electric field at the substrate where the particles are deposited. Thus, there is a large asymmetry in the electric field across the air gap such that the electric field at the conductive magnetic brush structure is greatly intensified relative to the electric field at the substrate where the particles are deposited.

In general, the electric field at the conductive magnetic brush structure is at least 300 percent as great as the electric field at the substrate where the particles are deposited. Thus, the asymmetry ratio, i.e., the ratio of the electric field at the conductive magnetic brush structure divided by the electric field at the substrate where the particles are deposited, is at least 3.0.

In one embodiment, the asymmetry ratio is at least 7.0. In another embodiment, the asymmetry ratio is at least 10.0.

From the above discussion, one desires a weak electric field on the order of 0.1 volts per micrometer or less at the substrate where the powder deposition occurs. Although most of the data described in this disclosure has been obtained for voltages around 1000 volts applied across a spacing of 1 centimeter between the magnetic brush sleeve and substrate (to provide an electric field at the substrate of 0.1 volts per micrometer), it should be noted that a much wider ranges of voltage and spacing can be used to obtain the weak electric field at the substrate. A spacing as close as the magnetic brush almost making contact (interactive) with the substrate (approximately 100 micrometers) can be used in conjunction with an applied voltage of 10 volts. On the other hand, a spacing as large as 10 centimeters can also be used provided the applied voltage is increased to 10,000 volts to obtain an electric field at the substrate of 0.1 volts per micrometer. Under the various conditions that produce an electric field on the order of 0.1 volts per micrometer at the substrate for different spacings and applied voltages, the electric field at the magnetic brush is intensified by at least an order of magnitude.

In one embodiment the spacing between the magnetic brush and the substrate is from about 0.1 millimeters to about 5 centimeters. In another embodiment, such spacing is from about 1 millimeter to about 2 centimeters. In yet another embodiment, such spacing is from about 0.5 to about 1.5 centimeters.

In one embodiment, for a spacing between the sleeve and the substrate of 1 centimeter, the voltage utilized is from about 500 to about 3000 volts.

Figure 10:
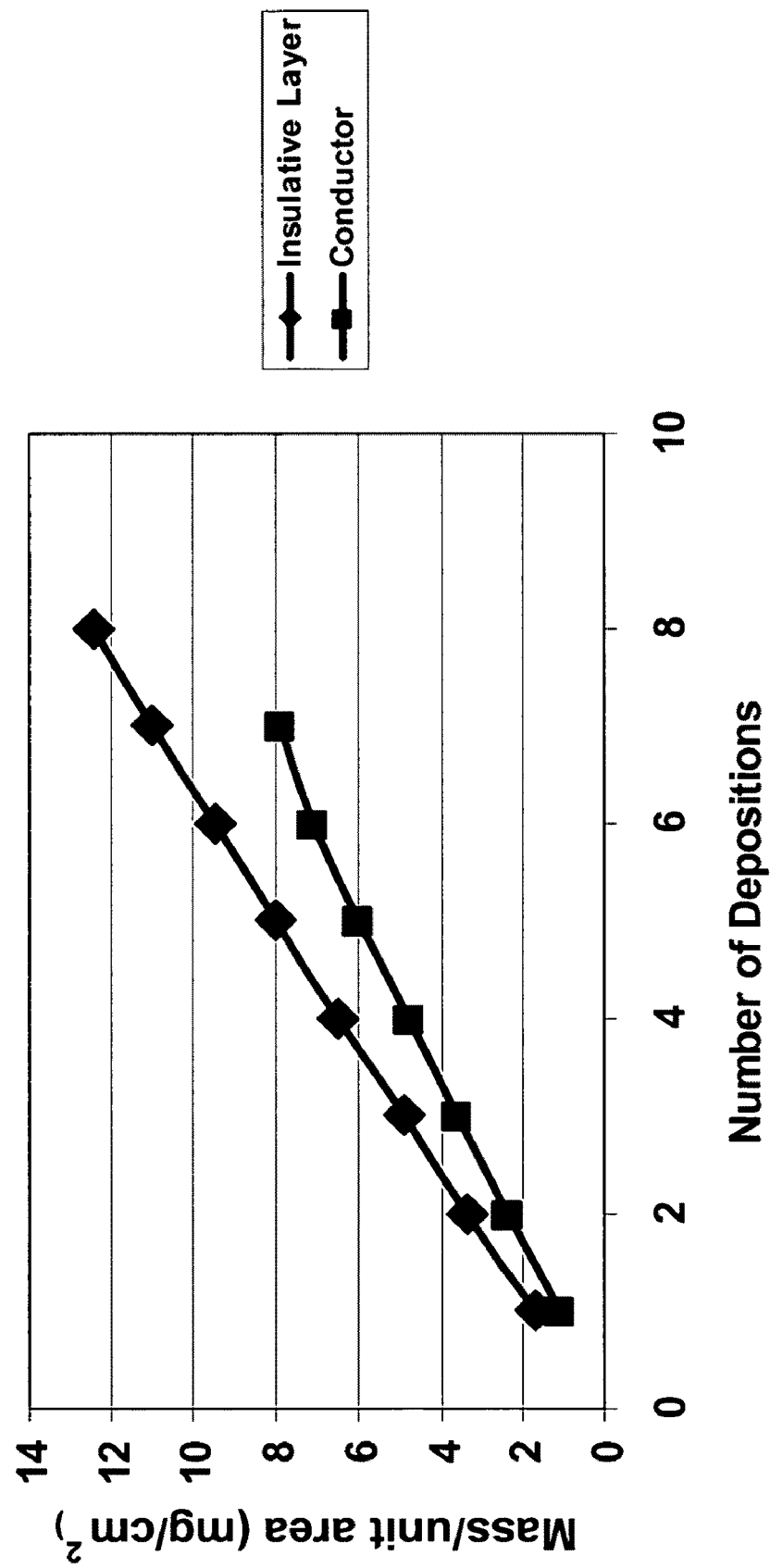
FIG. 10 is a graph for the deposited mass per unit area of a conductive powder onto insulative and conductive substrates versus the number of depositions obtained with the surrogate apparatus using a conductive powder and deposition on an insulative coating.

The measuring apparatus illustrated in FIG. 8 can also be used to determine how much powder mass per unit area, M/A, can be deposited on the upper electrode upon repeated depositions. FIG. 10 shows a graph for the dependence of the powder mass per unit area on the number of depositions for a mixture of 5% by weight of conductive Cabot XC-72R carbon powder mixed with 80 micrometer permanently magnetized strontium ferrite carrier beads partially overcoated with polyvinylidene fluoride (the same mixture material used for the data shown in FIG. 9.). The data for the insulative layer was obtained with poly(4,4'-oxydiphenylene-pyromellitimide)tape (50 micrometers thick) covering the upper electrode. The data for the conductive substrate was obtained with a bare aluminum upper electrode. For each deposition, about 0.30 grams of the mixture was loaded on the lower electrode. With +2000 volts applied across a spacing of 1 centimeter, the 8-pole magnet was rotated at 1500 revolutions per minute for 30 seconds after which the mass of the powder blend transferred to the upper electrode was weighed. These conditions were sufficient to transfer most of the powder in the mixture to the upper electrode. After each deposition, the depleted carrier beads were removed and another quantity of mixture loaded onto the lower electrode. One can see from FIG. 10 that the total mass per unit area of the deposited powder blend was essentially proportional to the number of depositions up to a total deposition of 12.4 milligrams per square centimeter for the insulative layer and 7.9 milligrams per square centimeter for the bare conductive electrode. Since a monolayer of coverage is about 1 milligram per square centimeter, it is clear that multiple layers of an induction charged conductive powder can be electrostatically deposited on either an insulative or conductive substrate. A range of conductive powder coverages from sub-monolayer to multiple layers are required for a number of industrial processing applications.

Figure 11:
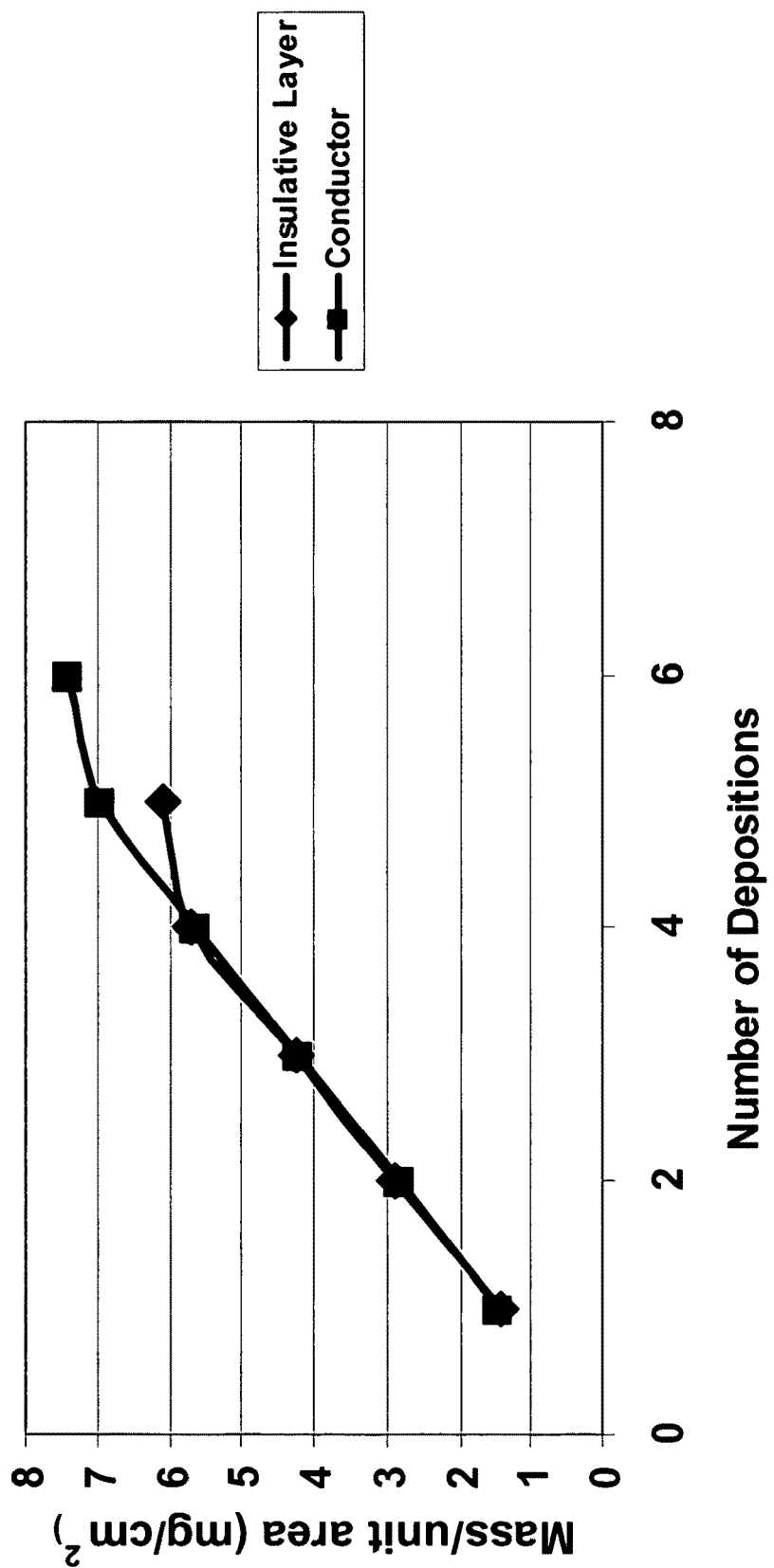
FIG. 11 is a graph for the deposited mass per unit area of a conductive powder blend with insulative toner onto insulative and conductive substrates versus the number of depositions obtained with the surrogate apparatus.

The measuring apparatus illustrated in FIG. 8 can also be used to determine how much of a blend of conductive powder with an insulative powder can be deposited on the upper electrode for either a conductive or insulative substrate. FIG. 11 shows the powder mass per unit area from multiple depositions of a conductive powder blend onto either an insulative or conductive substrate. The conductive substrate is aluminum whereas the insulative substrate consists of a 50 micrometer poly(4,4'-oxydiphenylene-pyromellitimide)insulative layer on a conductive electrode. The mixture on the lower electrode consisted of 4% by weight of powder blend (60% Cabot XC-72R carbon powder by weight blended with 40% by weight Dupont Zonyl MP 1400N polytetrafluoroethylene fluoroadditive) mixed with 80 micrometer permanently magnetized strontium ferrite carrier beads partially overcoated with polyvinylidene fluoride. For each deposition, about 0.30 grams of the mixture was loaded on the lower electrode. With +2000 volts applied across a spacing of 1 centimeter, the 8-pole magnet was rotated at 1500 revolutions per minute for 30 seconds after which the mass of the powder blend transferred to the upper electrode was weighed. These conditions are sufficient to transfer most of the powder blend in the mixture to the upper electrode. After each deposition, the depleted carrier beads were removed and another quantity of mixture loaded onto the lower electrode. One can see from FIG. 11 that the total mass per unit area of the deposited powder blend was essentially proportional to the number of depositions up to a total deposition of 6.1 milligrams per square centimeter and 7.4 milligrams per square centimeter for the conductive and insulative substrates, respectively. Thus, multiple layers of an induction charged conductive powder blend can be electrostatically deposited on either conductive or insulative substrates.

Figure 12:
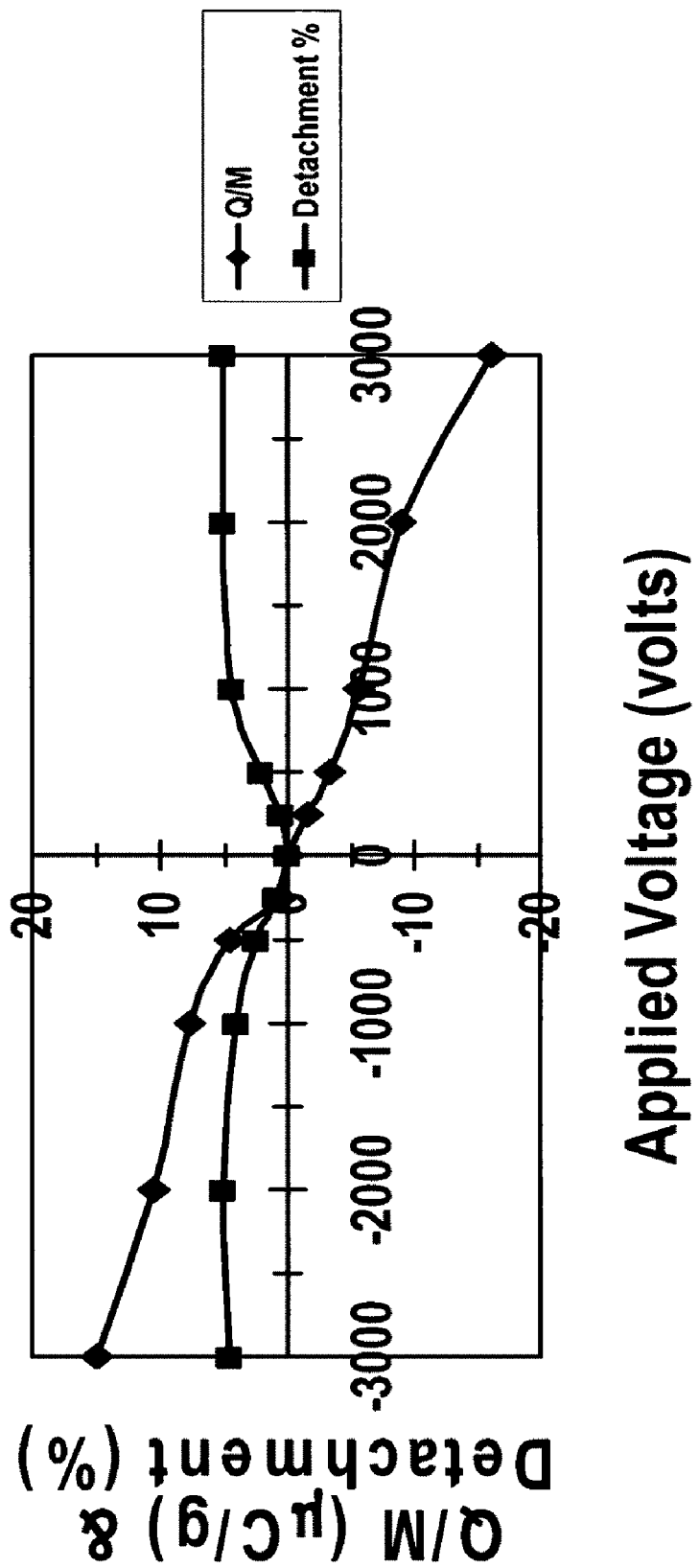
FIG. 12 illustrates the amount of powder transfer and its charge-to-mass ratio versus the magnitude and polarity of an applied potential across a gap for the deposition of a powder consisting of a blend of conductive and insulative powders onto a substrate with an insulative coating.

FIG. 12 shows a graph of Q/M and detachment percentage as a function of the applied voltage 49 for a typical mixture of materials appropriate for the manufacturing of catalytic electrodes for phosphoric acid fuel cell via the dry deposition process that is disclosed in one embodiment of this invention. A 60% by weight quantity of platinized carbon consisting of 15% by weight platinum on Cabot Black Pearls 2000 (produced by Johnson as HTBP2000) was blended in a high shear blender with a 40% by weight Dupont Zonyl MP 1600N fluoroadditive (produced by Dupont) of 12 micrometer average particle size. A 4% concentration by weight of the powder blend was mixed with carrier beads in a rotating glass jar for about 30 minutes. The carrier beads of 80 micrometer average size consisted of permanently magnetized strontium ferrite partially overcoated with polyvinylidene fluoride. About 0.25 grams of the mixture was loaded onto the lower electrode 56 of FIG. 8. With eight-pole magnet operating at 700 revolutions per minute (rpm) for 30 s with an applied voltage, the powder blend was induction charged and transported by an electrostatic force across the spacing of 1 centimeter. For an applied voltage magnitude of 2000 volts or greater, one can see that the curve for the Detachment % in FIG. 12 was near 4% which was the percentage of powder in the initial mixture.

For this range of applied voltages, most of the powder blend in the mixture was electrostatically detached and transferred to the upper electrode. For lower magnitudes of the applied voltage, the percentage of powder blend that could be removed deceases to the point where essentially no powder is deposited at zero volts. The symmetrical dependence of the Detachment % on the applied voltage is a signature for induction charging of the conductive powder blend. If the powder blend happened to be insulative and triboelectric charged by the carrier beads, the Detachment % curve would be highly asymmetrical in that powder would be transferred for one polarity whereas little or no powder would be transferred for the reverse polarity.

To obtain reliable measurements of the charge transfer to the upper electrode, it was necessary to cover the upper conductive electrode with a highly insulative layer such as poly (4,4'-oxydiphenylene-pyromellitimide)tape (50 micrometers thick) for the purpose of suppressing charge exchange between the conductive powder blend and conductive electrode. The Q/M curve in FIG. 12 for charge-to-mass ratio of the powder blend deposited on the upper electrode showed that the dependence of the Q/M magnitude on the applied voltage was independent of voltage polarity. The symmetry of the Q/M magnitude dependence on applied voltage was also consistent with the induction charging mechanism for charging the conductive powder blend. The Q/M of powder transferred with an applied voltage magnitude of 3000 volts was 50% greater than the magnitude of Q/M for 2000 volts. Over this voltage range, the Detachment % was essentially constant at the 4% level. Consequently, the charge on the deposited powder blend for this voltage range was proportional to the magnitude of the applied voltage.

Figure 13:
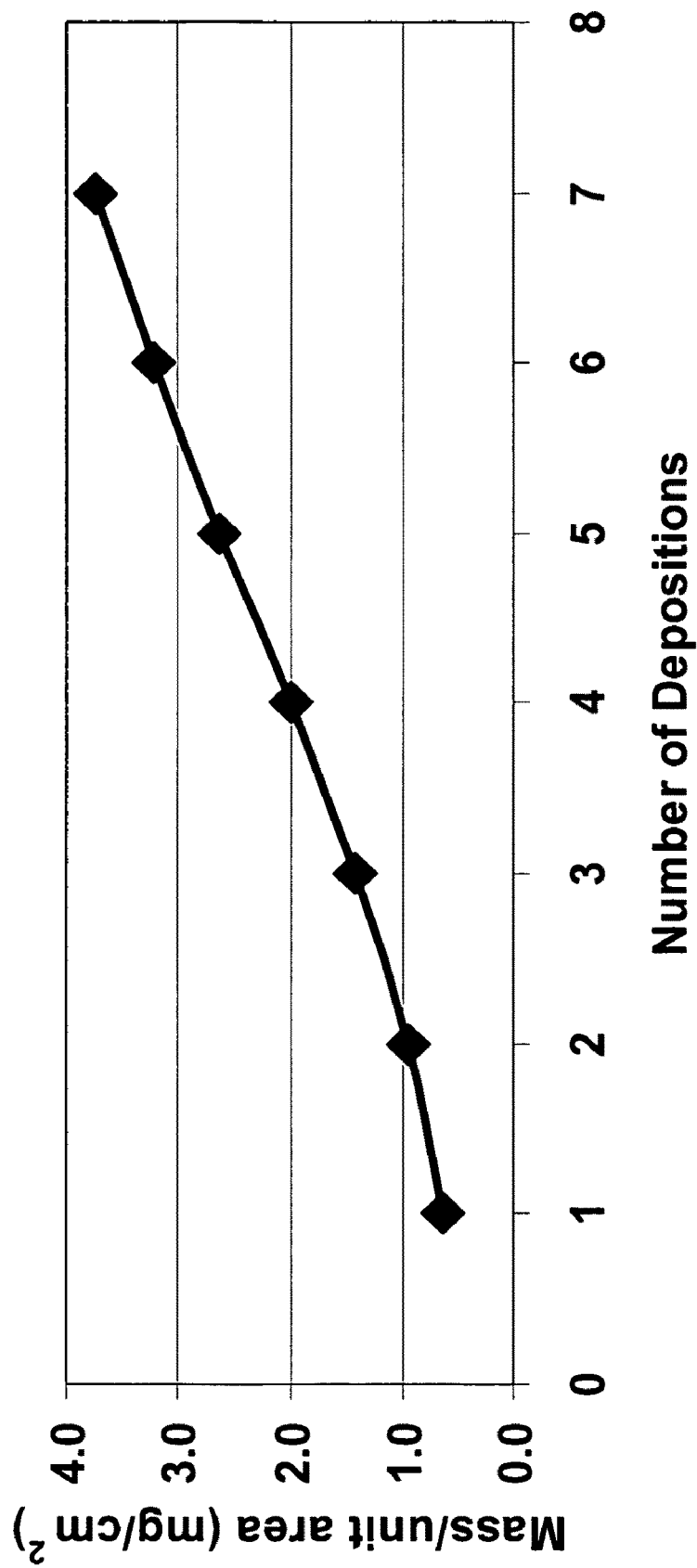
FIG. 13 is a graph for the deposited mass per unit area versus the number of depositions for measurements obtained with the surrogate apparatus using a powder consisting of a blend of conductive and insulative powders and deposition onto a conductive substrate.

The measuring apparatus illustrated in FIG. 8 can also be used to determine how much powder mass per unit area, M/A, can be deposited on the upper electrode when the substrate is conducting. To obtain data for conductive powder blend deposition onto a conductive substrate applicable to fuel cell electrodes, the upper electrode was covered with carbon paper TGP-120 produced by Toray Industries, Inc. The electrical resistivity through the plane of the 0.40 mm thick carbon paper was 0.18 ohm-centimeters. FIG. 13 shows a graph for the dependence of the powder blend mass per unit area on the number of depositions for a mixture of 5% by weight of powder blend (60% platinized carbon by weight blended with 40% by weight Dupont Zonyl MP 1600N fluoroadditive) mixed with 80 micrometers permanently magnetized strontium ferrite carrier beads partially overcoated with polyvinylidene fluoride. For each deposition, about 0.25 grams of the mixture was loaded on the lower electrode. With 2000 volts applied across a spacing of 1 centimeter, the eight-pole magnet was rotated at 700 rpm for 30 seconds after which the mass of the powder blend transferred to the upper electrode was weighed. These conditions were sufficient to transfer most of the powder blend in the mixture to the upper conductive carbon paper electrode. After each deposition, the depleted carrier beads were removed and another quantity of mixture loaded onto the lower electrode. One can see from FIG. 13 that the total mass per unit area of the deposited powder blend was essentially proportional to the number of depositions up to a total deposition of 3.7 milligrams per square centimeter. Thus, multiple layers of an induction charged conductive powder blend can be electrostatically deposited on a conductive substrate such as carbon paper. The amount of conductive powder blend that can be deposited onto a conductive substrate is comparable to the amount required for the deposition of catalytic layers on a carbon paper gas diffusion layer utilized in fuel cell electrodes.

To provide further evidence that electrostatic deposition of a conductive powder blend by the method disclosed herein by this invention can be used for the manufacturing of phosphoric acid fuel cell electrodes, the apparatus illustrated in FIGS. 1 and 5 was used to produce catalytic electrodes that were evaluated for performance in a test hydrogen fuel cell. A mixture of 60% by weight of platinized carbon consisting of 10% by weight platinum on carbon powder Cabot XC-72R (produced by Johnson as HiSPEC 2000) was blended in a high shear blender with a 40% by weight Dupont Zonyl MP 1600N fluoroadditive of 12 micrometer average particle size. A 4% by weight quantity of the powder blend was mixed with carrier beads in a rotating glass jar for about 30 minutes. The carrier beads of 80 micrometer average size consisted of permanently magnetized strontium ferrite partially overcoated with polyvinylidene fluoride. About 500 grams of the mixture was loaded into a 12 centimeter wide sump 21 illustrated in FIG. 5. With the sleeve 26 stationary and grounded, the twelve-pole magnet assembly 28 was rotated at a rotational speed of 50 rpm in the clockwise direction to provide transport of the mixture 41 in the counter-clockwise direction. With +2000 volts applied to a conductive carbon paper substrate 4 across a gap of 5 millimeters between the sleeve 26 and carbon paper moving at a speed of 2 millimeters per second, the mass per unit area of the powder blend electrostatically deposited on the carbon paper was 4.23 milligrams per square centimeter after two passes. This powder blend deposition corresponds to a platinum loading density of 0.25 milligrams per square centimeter, which represents a typical loading for fuel cell electrodes.

A powder blend electrostatically deposited on a carbon paper substrate exhibits low powder cohesion and adhesion to the substrate. To make the powder layer durable to mechanical handling without requiring the deposition of additional materials, it is necessary to heat the powder coated substrate to a temperature that is sufficient to cause softening of the fluoroadditive (e.g. PTFE) component of the powder. The melting point temperature of the Zonyl MP 1600N fluoroadditive is 325 degrees Celsius. Softening of the fluoroadditive requires a temperature around 355 degrees Celsius. One method for obtaining the requisite temperature is to use an oven purged with nitrogen to prevent oxidation (burning) of the carbon paper and carbon powder components. If a sample of carbon paper that has been electrostatically coated with a powder blend of platinized carbon and fluoroadditive is subjected to the temperature of 355 degrees Celsius in a nitrogen-purged oven, there is no change in the powder cohesion and adhesion to the substrate. The interpretation of this result is that heating alone is insufficient to cause intimate contact of the fluoroadditive particles since the bulk density of the electrostatically deposited layer is low and it is presumed that the carbon powder coats the fluoroadditive. Thus, the fluoroadditive particles are isolated and not able to coalesce by virtue of particle-to-particle contact when the fluoroadditive particles are softened at the elevated temperature.

To provide particle-to-particle contact of the fluoroadditive particles prior to heating, it was preferred to compact the powder blend coated layer by applying pressure. FIG. 1 illustrates the use of a pressure roll assembly 18 for compacting the powder blend layer. An alternative method was to place the powder coated sample between two rigid pressure plates in a hydraulic press. To provide compliancy between the pressure plates over the coated powder area, a rubber sheet (3 mm thick) was attached to one of the plates. To suppress powder transfer to the pressure plate, a release layer material was temporarily placed over the powder-coated sample before application of the compacting pressure. To obtain sufficient compaction without significant compression of the carbon paper, a pressure of 200 pounds per square inch was typically used. Following the powder compaction step and subjecting the sample to 355 degrees Celsius for 4 minutes in a nitrogen-purged oven, the powder blend layer was sintered and well-bonded to the carbon paper substrate.

To produce samples for testing, a powder blend consisting of 60% by weight of platinized carbon containing 10% by weight of platinum on carbon powder Cabot XC-72R blended with 40% by weight Dupont Zonyl MP 1600N fluoroadditive was electrostatically deposited onto Toray carbon paper TGP-120 at a coverage of about 4.2 milligrams per square centimeter, corresponding to a platinum loading of about 0.25 milligrams per square centimeter. The powder deposition was produced with the apparatus illustrated in FIG. 5 under the process conditions described above. The powder coating was subsequently compressed and sintered as also described above. Samples were tested as a cathode electrode in a phosphoric acid fuel cell. The performance of the dry coated electrode was compared to an electrode produced by a conventional wet method. The fuel cell was operated with hydrogen gas flow to the anode and air flow to the cathode. At a current loading of 0.19 amperes per square centimeter, the cell voltage was 455 millivolts and 512 millivolts for cells containing the dry and wet (conventional) produced cathode, respectively.

It is clear from the foregoing that the apparatus and method described for this embodiment of the invention enables the electrostatic deposition of a conductive and insulative powder blend onto conductive substrates. The material components are appropriate for the fabrication of catalytic electrodes for various types of fuel cells. The conductive powder typically consists of a conductive catalyst such as platinum supported by a conductive powder such as carbon powder. The catalyst can be a single metal such as Pt as well as binary and tertiary mixtures. Examples of binary catalytic mixtures include Pt—Co, Pt—Cr, Pt—Fe, Pt—Ir, Pt—Mn, Pt—Mo, Pt—Ni, Pt—Pd, Pt—Rh, Pt—Ru, Pt—V and Pd—Au. Examples of tertiary mixtures include Pt—Ru—Al, Pt—Ru—Mo, Pt—Ru—Cr, Pt—Ru—Ir, Pt—Ru—Mn, Pt—Ru—Co, Pt—Ru—Nb, Pt—Ru—Ni, Pt—Ru—Pd, Pt—Ru—Rh, Pt—Ru—W and Pt—Ru—Zr. The support for the catalytic materials can be in the form of a carbon powder or carbon nanotubes. The insulative powder is typically an inert polymeric material such as polytetrafluoroethylene that provides a support for catalyst and enables sintering of the powder blend to itself and the substrate for handling robustness. The conductive substrate is typically a carbon paper or cloth that serves as a porous diffusion layer for gas and liquid transport.

The spacing layer containing the phosphoric acid can also be manufactured by electrostatic deposition of a powder blend containing PTFE and conductive silicon carbide. The methods and apparatus for the powder electrostatic deposition are similar to that used in the manufacturing of powder coated catalytic electrodes. The powder can be directly deposited on either an unsintered or sintered powder layer deposited on either the anode or cathode catalytic electrode. The composite consisting of the powder deposited catalytic electrode and the spacer layer can then be compacted and sintered.

Although the discussion of the apparatus and method described herein for electrostatic deposition of powder onto a substrate has been described with regard to a single deposition unit, it should be noted that more than one sleeve can be used in a deposition unit and that multiple passes can also be used with a single deposition unit whereby each deposited layer is optionally compacted before the next pass. An alternative method for electrostatic deposition of the powder layer is to use a single pass with multiple deposition units. In this case, each unit can contain powders with different materials content to enable the deposition of a powder layer with a gradation in properties across the layer.

All of the present discussion has been in the context that the deposition is on the final substrate. Instead of depositing the powder directly onto the final substrate, the powder layer can be deposited onto an intermediate such as an insulative substrate and subsequently transferred to a final conductive substrate. The powder layer transfer from the intermediate to the final substrate can be obtained by the application of either pressure and/or heat.

It is clear from the foregoing that an apparatus and method have been disclosed that enables electrostatic deposition of conductive powder or a blend of a conductive powder with an insulative powder onto either conductive or insulative substrates. The deposition coverage can range from sub-mono-layer to multilayers. For conductive powder containing a polymeric component, the deposited powder can be bonded together and with the substrate by applying a combination of pressure, heat or solvent vapor. If a conductive film is desired, multi-layers can he heat/pressure/solvent vapor treated. For a conductive and insulative powder blend, the combination of pressure, heat or solvent vapor can also be utilized to form a conductive film.

As the above examples illustrate, the process and apparatus for induction-charging conductive powder for electrostatic deposition onto either insulative or conductive substrates is compatible with the powder being non-magnetic. It should be noted, however, the process and apparatus are compatible with the powder being magnetic provided this is a desired property of the powder and coating. For powder made from a blend of conductive powder with insulative powder, either component or both can be magnetic. For most applications, non-magnetic powder is preferred since the inclusion of a magnetic material in the powder can result in undesired consequences regarding other powder properties.

The foregoing discussion has described various embodiments of a powder deposition system (FIG. 5) for utilization in a manufacturing system (FIG. 1) to produce uniform conductive powder/blend coatings on either conductive or insulative substrates. In other applications, there is a need for the deposition to be patterned on an insulative substrate. For these applications, an electrostatic latent image can be used to control the powder deposition according to a desired pattern. Generally, two methods have been used in the document imaging industry to produce electrostatic images. The more widely practiced method of electrophotography exposes a pre-charged photoreceptor to an imaging light source such as a scanning modulated laser beam or a light emitting diode array. The other method produces an electrostatic image by selectively depositing electrons/ions directly onto a dielectric (insulating) layer. The electrons/ions are produced from gas plasma. The electron/ion deposition is controlled by a modulated electrode array.

Figure 14:
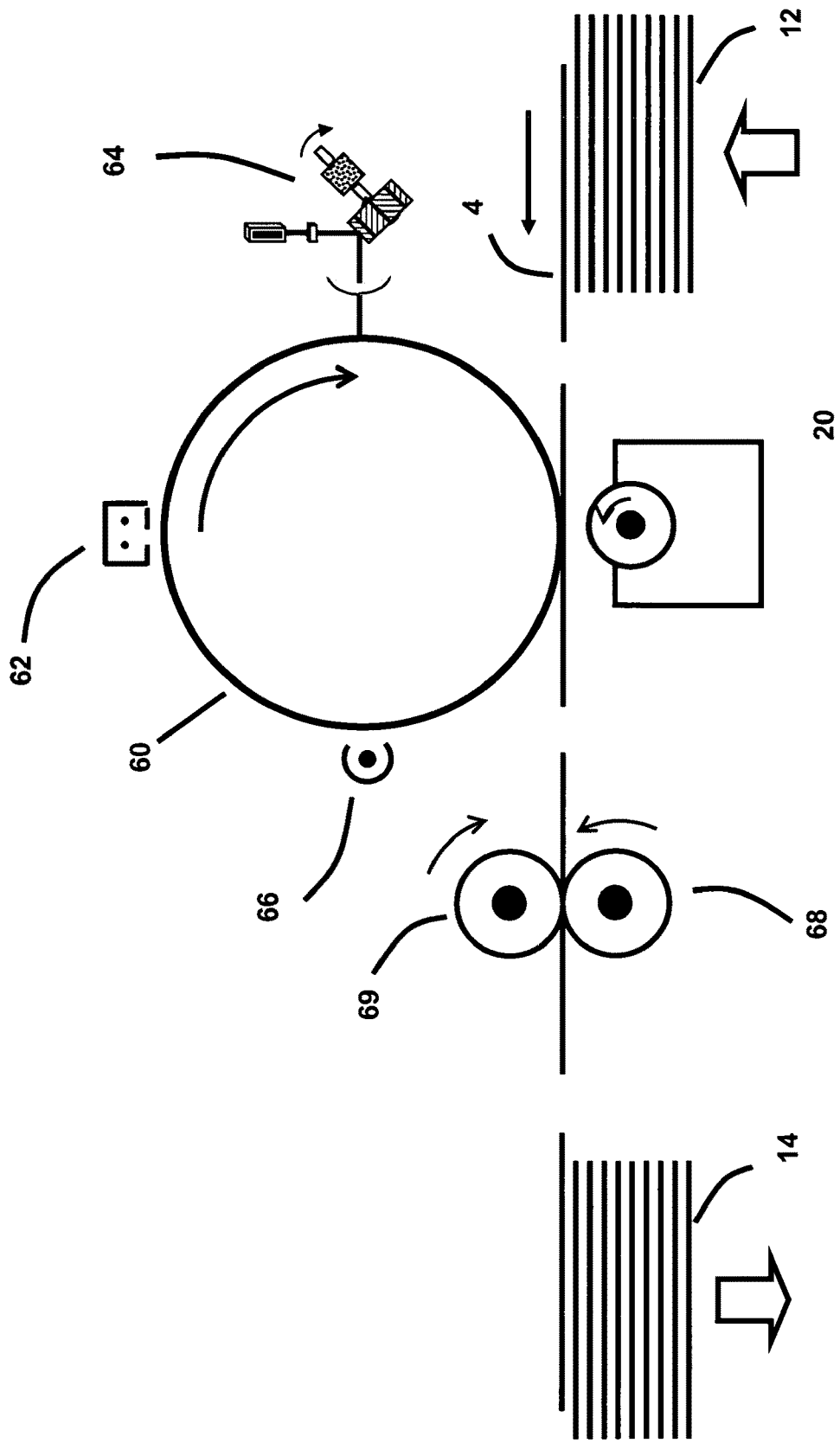
FIG. 14 is a side view drawing of an imaging process that produces patterned powder coatings according to the first embodiment of this invention.

FIG. 14 illustrates the elements of an electrophotographic system for selectively depositing conductive powder/blend onto an insulative substrate 4 fed from a feeding stack 12. The photoreceptor 60 can be in the form of either a drum or belt overcoated with either an organic or inorganic coating such as amorphous silicon. For organic coatings, the photoreceptor typically consists of separate layers for charge generation and charge transport. The photoreceptor is sensitized by a charging device 62 that deposits a uniform charge by one of many types of gaseous (corona) ion devices including screened corotrons, biased charging rolls, etc. A latent electrostatic image can be formed by light exposure from a laser raster output scanner 64. Other imaging light source options include a light emitting diode array or the light from an illuminated document focused on the photoreceptor through an optical system. The latent electrostatic image on the photoreceptor can have contrast electrostatic potentials up to 1000 volts.

The insulative substrate 4 is preferably brought into intimate contact with the electrostatic image on the rotating photoreceptor. The grounded sleeve of the deposition unit 20 is spaced a few millimeters from the insulative substrate as illustrated in FIG. 14. With this spacing and electrostatic potentials of 700 to 1000 volts on the photoreceptor, conductive powder/blend from the mixture on the development sleeve is deposited on the interposed insulative substrate. In photoreceptor regions where the electrostatic potential is near zero, there will be essentially no deposition of the conductive powder/blend. It should be noted, however, that since the powder charging is induction charged from the electrostatic potential on the photoreceptor, the demarcation of powder deposition between the regions separating image and non-image areas is anticipated to be somewhat fuzzy. The spatial resolution is expected to be on the order of the air gap that is typically a few millimeters. Nevertheless, this spatial resolution is sufficient to control the powder deposition pattern desired for many applications.

When the powder deposited substrate is removed from the photoreceptor, it is likely that air breakdown occurs between the photoreceptor and substrate in the regions where there is charged conductive powder. Since the air breakdown can disrupt the uniformity of the deposited powder, the charged powder can be partially neutralized with a gaseous ion device (not shown) to suppress any disruption of the powder layer upon separation. The electrostatic image can be reused for multiple powder depositions onto substrates provided there is no significant change in the photoreceptor charge level.

After each imaging cycle, the powder-coated substrate is advanced to a unit that has a heated compliant roll 68 in contact with the powder image. The heated compliant roll consists of a low surface energy material for which a thin layer of a release agent liquid can be applied. A pressure roll 69 is provided in back of the substrate in juxtaposition to the heated compliant roll. The combination of heat and pressure sinters or fuses the conductive powder/blend together as well adhering the powder layer to the substrate. The powder coated and sintered/fused substrate is advanced to a station 14 for stacking the finished sheets 4. The residual electrostatic image on the photoreceptor is neutralized by gaseous ions and/or light exposure from a device 66 in preparation for the next imaging cycle.

Figure 15:
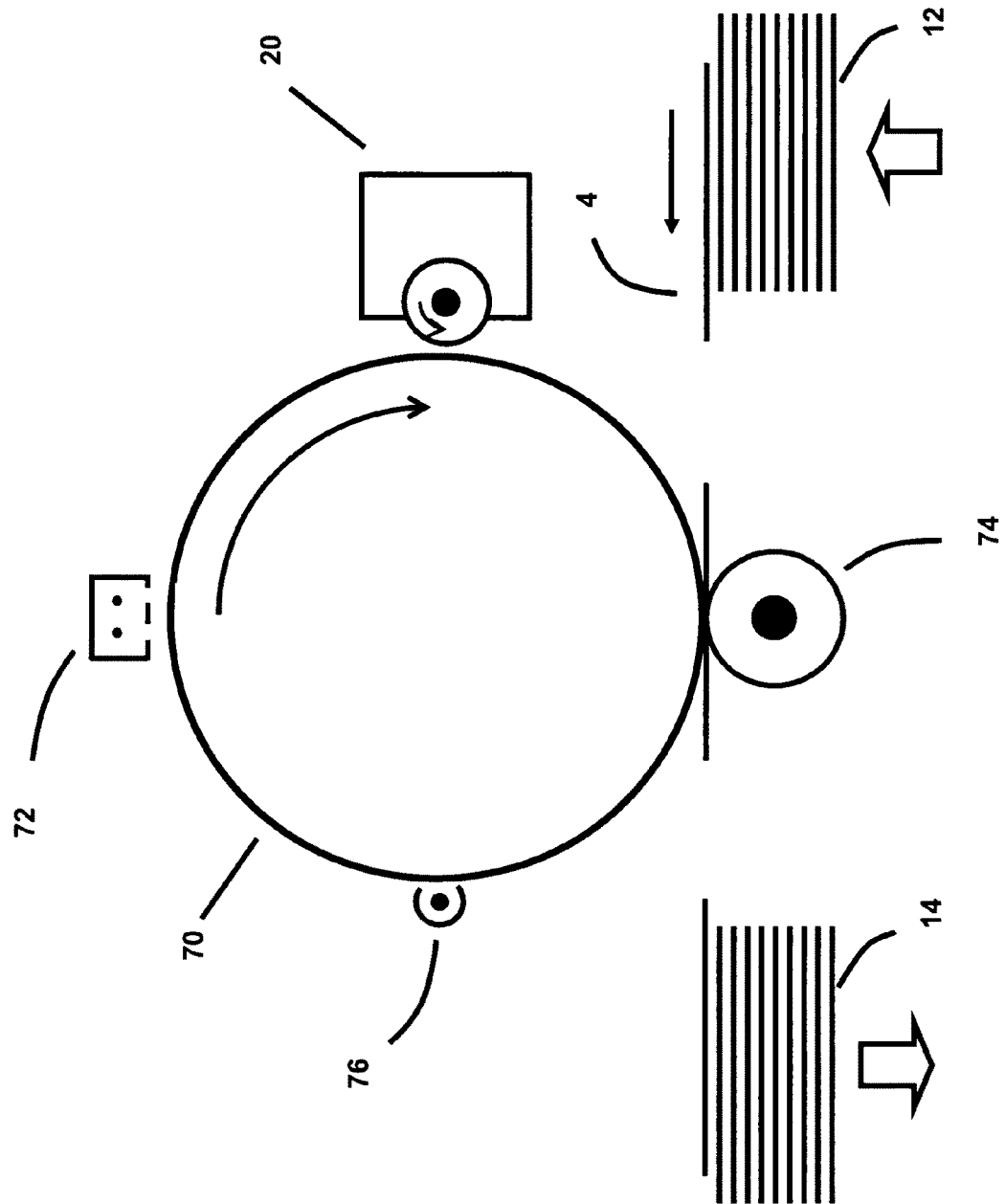
FIG. 15 is a side view schematic drawing of an alternative imaging process that produces patterned powder coatings according to the first embodiment of this invention.

The other method for producing an electrostatic image uses an electrographic system to selectively deposit electrons/ions directly onto a dielectric (insulating) layer. FIG. 15 illustrates the elements of an electrographic system for selectively depositing a conductive powder/blend onto an insulative substrate 4 fed from a feeding stack 12. The electroreceptor 70 is a dielectric layer on the drum that is overcoated with a durable inorganic material such as anodized aluminum. A latent electrostatic image can be formed by the electron/ion writing device 72 in which the electrons/ions from a gas plasma are controlled by a modulated electrode array. In the charged regions, the conductive powder/blend from the deposition unit 20 with an air gap is induction charged and deposited on the electroreceptor. In the uncharged regions, there is essentially no deposition of the conductive powder/blend. As discussed above, the spatial resolution is expected to be on the order of the air gap that is typically a few millimeters. The insulative substrate 4 is advanced in contact with the powder-coated electroreceptor. A high-pressure roll 74 provided behind the substrate in juxtaposition to the electroreceptor causes the conductive powder/blend to simultaneously transfer and fuse together to form a cohesive conductive film that is bonded to the substrate. The transfused powder on the substrate is advanced to a stacking station 14.

Figure 16:
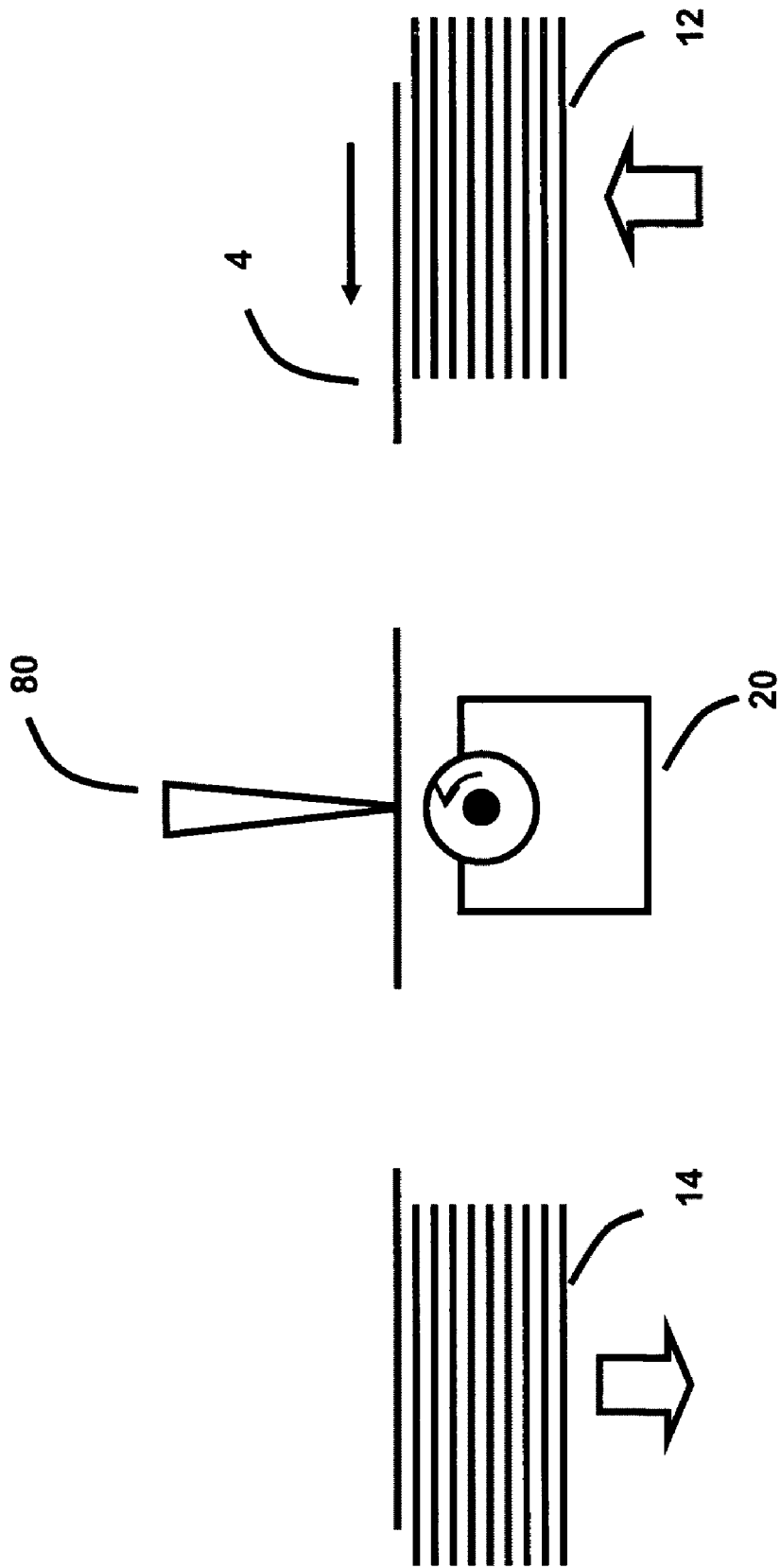
FIG. 16 is a side view schematic drawing of an alternative imaging process that produces patterned powder coatings according to the first embodiment of this invention.

A method for producing a patterned layer directly onto a dielectric (insulating) layer without the need to create a latent image uses an array of pins. FIG. 16 illustrates the elements of a direct electrographic system for selectively depositing a conductive powder/blend onto an insulative substrate 4 fed from a feeding stack 12. The pin array 80 is represented in side view and consists of conductive pins electrically insulated from each other and in close contact with the side of the insulative substrate opposite to the side where the conductive powder is to be placed. Each pin in the array can be selectively electrically biased with respect to the grounded sleeve of the deposition unit 20. The grounded sleeve of the deposition unit 20 is spaced a few millimeters from the insulative substrate and opposite to the pin array as illustrated in FIG. 16. With pin potentials of 200 to 800 volts conductive powder/blend from the mixture on the development sleeve is deposited on the interposed insulative substrate. In regions where the pin potential is near zero, there will be essentially no deposition of the conductive powder/blend. It should be noted, however, that since the powder charging is induction charged from the potential on the pin, the demarcation of powder deposition between the regions separating image and non-image areas is anticipated to be somewhat fuzzy. The spatial resolution is expected to be on the order of the air gap that is typically a few millimeters. Nevertheless, this spatial resolution is sufficient to control the powder deposition pattern desired for many applications.

FIGS. 14, 15 and 16 illustrate apparatus for powder coating substrates that are precut to size for stacking and feeding. With a substrate in roll form as illustrated in FIG. 2, a continuous substrate web can then be fed past the various stations for producing the desired coating. A finished article can then be cut from the web material to obtain a desired size and shape.

Other embodiments and modifications of the present invention may occur to those skilled in the art subsequent to a review of the information presented herein; these embodiments and modifications are included within the scope of this invention.

What is claimed is:

1. A method for manufacturing electrodes with a first electrostatic deposition unit that is comprised of a sump, a sleeve, and voltage supply, comprising the steps of:
   (a) depositing a conductive powder with a charge relaxation time of less than about 1 second onto a substrate with said first electrostatic deposition unit, wherein said conductive powder is mixed with magnetic carrier beads in said sump to form a mixture of conductive powder and magnetic carrier beads, wherein said mixture is fed onto said sleeve, and wherein said mixture forms a magnetic brush on said sleeve;
   (b) positioning said substrate away from said magnetic brush such that an air gap is disposed between said substrate and said magnetic brush;
   (c) imposing a voltage between said substrate and said sleeve; and
   (d) producing a large asymmetry between said magnetic brush and said substrate such that the electric field at said magnetic brush is at least 3.0 times as great as the electric field at such substrate.

2. The method as recited in claim 1, wherein said magnetic brush is formed by a magnetic field produced by said first electrostatic deposition unit.

3. The method as recited in claim 2, wherein said magnetic field is produced by rotating magnets disposed within said sleeve.

4. The method as recited in claim 2, wherein said magnetic field is produced by stationary magnets disposed within said sleeve, and wherein said sleeve is rotatable.

5. The method as recited in claim 1, wherein said voltage between said substrate and said sleeve is from about 10 to about 10,000 volts.

6. The method as recited in claim 1, wherein said voltage between said substrate and said sleeve is from about 500 to about 3000 volts.

7. The method as recited in claim 1, wherein said substrate is substantially planar.

8. The method as recited in claim 1, wherein said conductive powder is non-magnetic.

9. The method as recited in claim 1, wherein said conductive powder is magnetic.

10. The method as recited in claim 1, wherein said charge relaxation time of said conductive powder is less than about 10 milliseconds.

11. The method as recited in claim 1, wherein said mixture of conductive powder and magnetic carrier beads is comprised of at least about 60 weight percent of said magnetic carrier beads.

12. The method as recited in claim 11, wherein said mixture of conductive powder and magnetic carrier beads has a charge relaxation time of less than about 1 second.

13. The method as recited in claim 11, wherein said mixture of conductive powder and magnetic carrier beads has a charge relaxation time of less than about 10 milliseconds.

14. The method as recited in claim 1, comprising the step of mixing a conductive powder and an insulative powder in a high-shear blender to provide a conductive mixture.

15. The method as recited in claim 1, wherein said magnetic carrier beads are permanently magnetized.

16. The method as recited in claim 1, comprising the step of compacting said conductive powder deposited onto said substrate.

17. The method as recited in claim 16, wherein said conductive powder deposited onto said substrate is compacted by the application of pressure.

18. The method as recited in claim 1, comprising the step of sintering said conductive powder deposited onto said substrate.

19. The method recited in claim 1, wherein said substrate is in the form of a sheet.

20. The method as recited in claim 1, wherein said substrate is in the form of a web.

21. The method as recited in claim 1, comprising the step of moving said substrate past said first electrostatic deposition unit.

22. The method as recited in claim 21, wherein said substrate is fed past said first electrostatic deposition unit at least two times, and wherein multiple layers of powder are deposited onto said substrate.

23. The method as recited in claim 1, comprising the step depositing powder onto said substrate with a second electrostatic deposition unit.

24. The method as recited in claim 1, wherein said substrate is a conductive substrate.

25. The method as recited in claim 24, wherein said substrate has a conductivity of at least about $10^{-11}$ Siemens per meter.

26. The method as recited in claim 24, wherein said substrate has a conductivity of at least about $10^{-8}$ Siemens per meter.

27. The method as recited in claim 1, wherein said substrate is an insulative substrate that has a charge relaxation time of greater than 10 seconds.

28. The method as recited in claim 27, wherein said insulative substrate is comprised of a powder deposition side onto which said conductive powder is deposited.

29. The method as recited in claim 28, wherein a ground plane is disposed on the side opposing said powder deposition side.

30. The method as recited in claim 1, comprising the step of transferring the conductive powder that has been deposited onto substrate to another material.

31. The method as recited in claim 30, wherein said conductive powder is transferred to said another material by the application of heat.

32. The method as recited in claim 30, wherein said conductive powder is transferred to said another material by the application of pressure.

33. The method as recited in claim 1, comprising the step of depositing said conductive powder onto said substrate in a pattern.

34. The method as recited in claim 33, wherein said substrate is an insulative substrate with a charge relaxation time of at least 10 seconds.

35. The method as recited in claim 33, comprising the step of forming a latent electrostatic image on said substrate by patterned ion deposition.

36. The method as recited in claim 33, wherein said substrate is a photoconductive substrate.

37. The method as recited in claim 36, comprising the step of forming a latent electrostatic image on said substrate by pattered light exposure.

38. The method as recited in claim 1, wherein said substrate is an insulative substrate, and wherein said insulative substrate does not comprise a ground plane.

39. The method as recited in claim 38, wherein said insulative substrate is comprised of a powder deposition side onto which said conductive powder is deposited.

40. The method as recited in claim 39, wherein an array of conductive pins is disposed on the side of said insulative substrate that opposes said powder deposition side.

41. The method as recited in claim 40, comprising the step of imposing a voltage of from about 200 to about 800 volts between said array of conductive pins and said magnetic brush.

42. The method as recited in claim 1, wherein the spacing between said magnetic brush and said substrate is from about 1 millimeter to about 10 centimeters.

43. The method as recited in claim 1, wherein said magnetic carrier beads have an average size of from about 20 micrometers to about 1000 micrometers.

* * * * *